(12) United States Patent
Inokuma

(10) Patent No.: US 7,932,692 B2
(45) Date of Patent: Apr. 26, 2011

(54) CONTROL SYSTEM FOR ROTARY ELECTRIC MACHINE WITH SALIENT STRUCTURE

(75) Inventor: Kenji Inokuma, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 723 days.

(21) Appl. No.: 11/939,113

(22) Filed: Nov. 13, 2007

(65) Prior Publication Data

US 2008/0111516 A1 May 15, 2008

(30) Foreign Application Priority Data

Nov. 13, 2006 (JP) ................. 2006-306912
Mar. 6, 2007 (JP) ................. 2007-056008

(51) Int. Cl.
*H02P 23/00* (2006.01)

(52) U.S. Cl. ........ 318/799; 318/432; 318/727; 318/767; 318/798

(58) Field of Classification Search .................. 318/432, 318/727, 767, 798, 799
See application file for complete search history.

(56) References Cited

U.S. PATENT DOCUMENTS

| | | | | |
|---|---|---|---|---|
| 5,963,007 A * | 10/1999 | Toyozawa et al. | ............ | 318/799 |
| 6,166,514 A * | 12/2000 | Ando et al. | ................. | 318/811 |
| 6,320,349 B1 * | 11/2001 | Kaneko et al. | ................. | 318/798 |
| 6,359,415 B1 * | 3/2002 | Suzuki et al. | .................. | 318/727 |
| 6,555,988 B2 | 4/2003 | Masaki et al. | | |
| 6,927,548 B2 * | 8/2005 | Nishizaki et al. | ............. | 318/432 |
| 6,940,250 B2 * | 9/2005 | Nishimura et al. | ........... | 318/705 |
| 7,005,828 B2 | 2/2006 | Karikomi | | |
| 7,023,170 B2 * | 4/2006 | Yasukawa et al. | ............ | 318/799 |
| 7,791,295 B2 * | 9/2010 | Oi et al. | ......................... | 318/432 |
| 2001/0002784 A1 * | 6/2001 | Masaki et al. | ................ | 318/727 |
| 2005/0146306 A1 * | 7/2005 | Ha et al. | ......................... | 318/807 |
| 2007/0052381 A1 * | 3/2007 | Ueda et al. | .................... | 318/432 |
| 2008/0042614 A1 * | 2/2008 | Oomura et al. | ............... | 318/799 |

FOREIGN PATENT DOCUMENTS

| | | |
|---|---|---|
| JP | 2001-169590 | 6/2001 |
| JP | 2004-080986 | 3/2004 |
| JP | 2004-254423 | 9/2004 |

* cited by examiner

*Primary Examiner* — Walter Benson
*Assistant Examiner* — Kawing Chan
(74) *Attorney, Agent, or Firm* — Nixon & Vanderhye PC

(57) ABSTRACT

In a system for controlling rotation of a rotor of a multiphase rotary electric machine in relation to a stator thereof, a superimposing unit superimposes a first frequency signal on the input signal to the multiphase rotary electric machine. The first frequency signal has a first phase and a first period, and the first period is different from a period of rotation of the rotor. An amplitude detector detects an amplitude of a second frequency signal. The second frequency signal is actually propagated in the multiphase rotary electric machine with a second phase based on the superimposed first frequency signal. A rotation angle determiner determines a rotation angle of the rotor so as to eliminate a difference between the detected amplitude of the second frequency signal and a predetermined target amplitude thereof.

9 Claims, 27 Drawing Sheets

FIG. 6
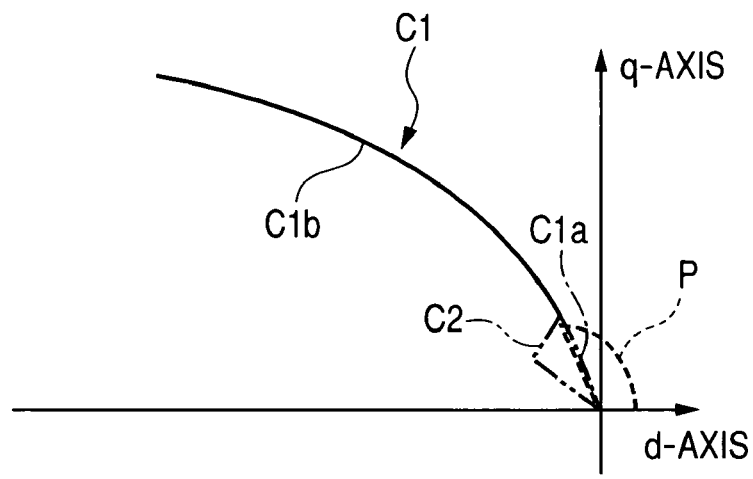
FIG. 7A
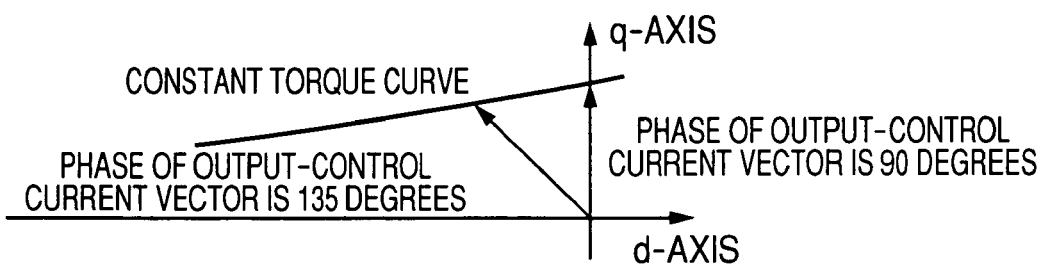
FIG. 7B
FIG. 7C
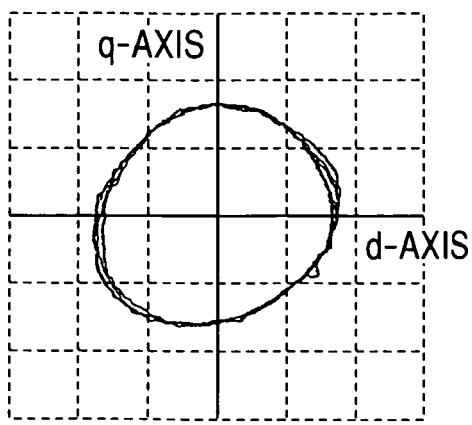
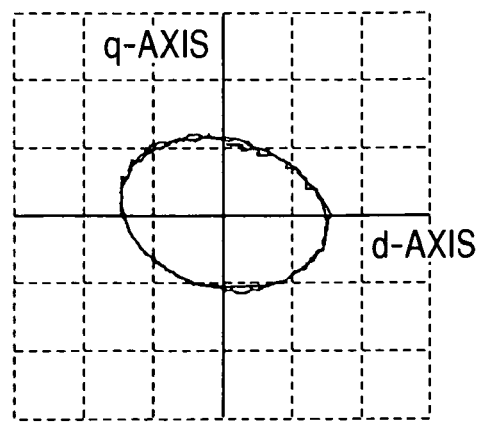

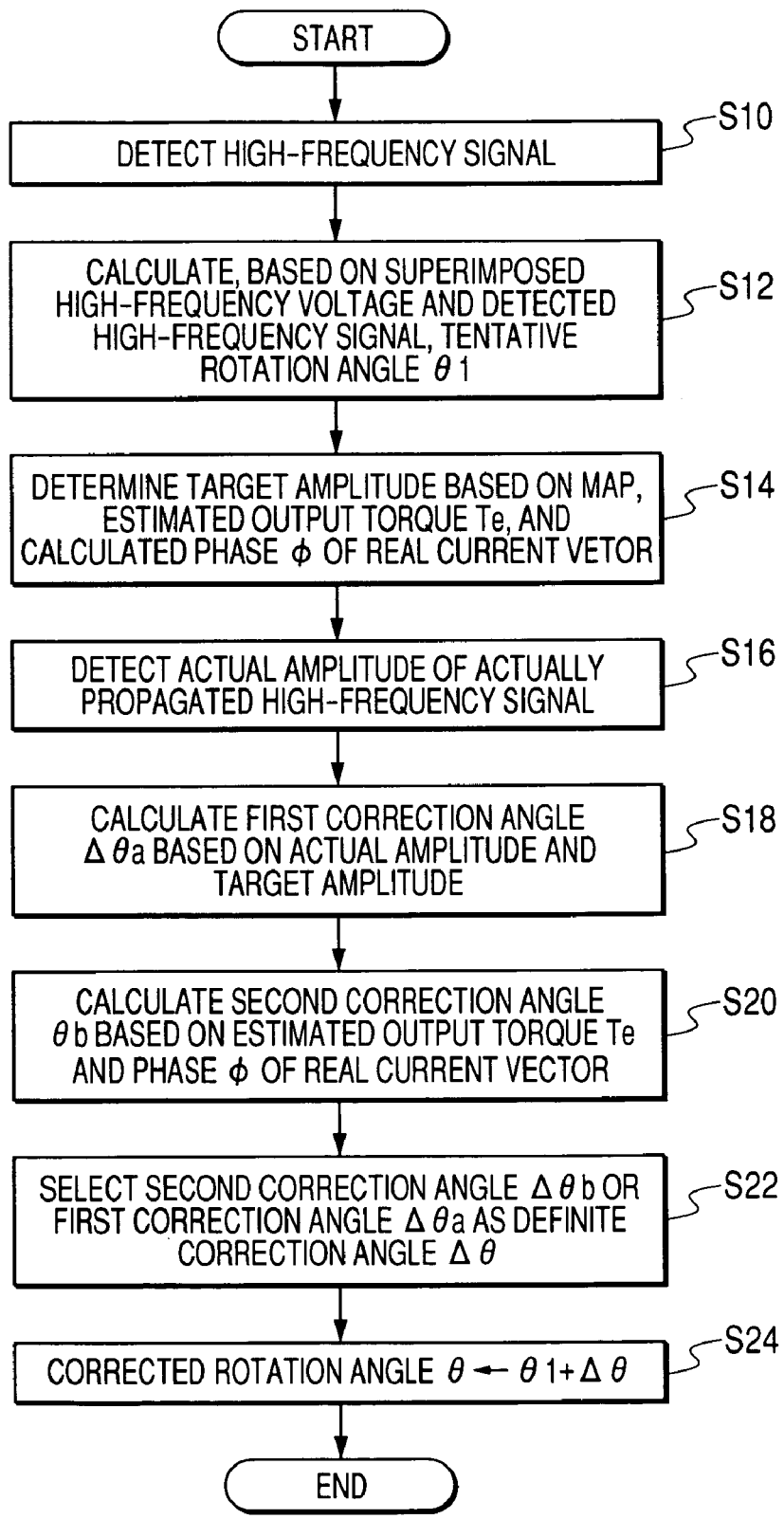

|vhdc| = |vhqc|

…

CONTROL SYSTEM FOR ROTARY ELECTRIC MACHINE WITH SALIENT STRUCTURE

CROSS REFERENCE TO RELATED APPLICATIONS

This application is based on Japanese Patent Applications 2006-306912 and 20077056008 filed on Nov. 13, 2006 and Mar. 6, 2007, respectively. This application clams the benefit of priority from the Japanese Patent Applications, so that the descriptions of which are all incorporated herein by reference.

FIELD OF THE INVENTION

The present invention relates to systems for estimating a rotation angle of a rotor of a rotary electric machine with respect to a fixed reference axis of a stator thereof according to change in a periodic signal created in the rotary electric machine.

BACKGROUND OF THE INVENTION

An example of various types of control systems for a three-phase motor is disclosed in U.S. Pat. No. 6,555,988 B2 corresponding to Japanese Patent Application Publication No. 2001-1169590.

A control system disclosed in the US Patent Publication superimposes a high-frequency AC voltage on an output signal from an inverter in an estimated direct axis (d-axis) $\theta$ of a rotor of a salient three-phase motor; this inverter supplies AC power thereto. The control system also calculates a rotation angle of the rotor based on a current signal actually created in the AC motor.

The salient structure (salient characteristic) of the three-phase motor means a characteristic in which a magnetic resistance created in a d-axis of the three-phase motor is higher than that created in a q-axis thereof. In other words, the salient structure (salient characteristic) of the three-phase motor means a characteristic in which inductance in the d-axis of the tree-phase motor is lower than that in the q-axis thereof.

Specifically, the three-phase motor has the minimum inductance in the real d-axis direction of the rotor because of the salient structure of the rotor, which allows current to flow easier in the d-axis of the rotor than that following in a quadrature axis (q-axis) thereof. For this reason, the current signal actually created in the three-phase motor has a d-axis component higher than a q-axis component thereof independently of the phase of the superimposed AC voltage.

Thus, when a vector of the current signal actually created in the three-phase motor is deviated from the estimated d-axis, the estimated d-axis is determined to be deviated from the actual d-axis of the rotor. As a result of focusing on the deviation, the control system repeatedly executes the AC voltage superposition so as to reduce the deviation between the estimated d-axis and the actual d-axis for each executions thereby improving the accuracy of estimation of the rotation angle of the rotor.

Increase in an output torque of a three-phase motor may invite partially magnetic saturation in a three-phase motor. This may cause a direction in which the inductance is minimum to be shifted from the actual d-axis toward a vector of a current for driving the three-phase motor, and therefore, the inductance in the d-axis direction becomes substantially equal to that in the q-axis direction. This may make it difficult for the control system disclosed in the US Patent Publication to properly calculate the rotation angle of the rotor.

Especially, in recent years, downsizing in three-phase motors and growing desire for high output torque may encourage magnetic saturation to be created. For this reason, the control system disclosed in the US Patent Publication may be more difficult to properly obtain the rotation angle of the rotor due to the magnetic saturation.

SUMMARY OF THE INVENTION

In view of the foregoing circumstances, an object of at least one aspect of the present invention is to properly obtain a rotation angle of a rotor of a rotary electric machine in relation to a stator thereof.

According to one aspect of the present invention, there is provided a system for controlling rotation of a rotor of a multiphase rotary electric machine in relation to a stator thereof. An output of the multiphase rotary electric machine is controlled based on an input signal thereto. The system includes a superimposing unit that superimposes a first frequency signal on the input signal to the multiphase rotary electric machine. The first frequency signal has a first phase and a first period, and the first period is different from a period of rotation of the rotor. The system includes an amplitude detector that detects an amplitude of a second frequency signal. The second frequency signal is actually propagated in the multiphase rotary electric machine with a second phase based on the superimposed first frequency signal. The system includes a rotation angle determiner that determines a rotation angle of the rotor so as to eliminate a difference between the detected amplitude of the second frequency signal and a predetermined target amplitude thereof.

According to another aspect of the present invention, there is provided a system for controlling rotation of a salient rotor of a multiphase rotary electric machine in relation to a stator thereof. An output of the multiphase rotary electric machine is controlled based on an input signal thereto. The system includes a superimposing unit configured to superimpose, on the input signal to the multiphase rotary electric machine, a direct-axis frequency signal directed in a direct axis of the rotor and a quadrature-axis frequency signal directed in a quadrature axis of the rotor orthogonal to the direct axis. Each of the direct-axis and quadrature-axis frequency signals has a first phase and a first period. The first period is different from a period of rotation of the rotor. The system includes a tentative angle calculator configured to calculate a tentative rotation angle of the rotor based on a second phase of a first frequency signal. The first frequency signal is actually propagated in the multiphase rotary electric machine with the second phase based on the superimposed direct axis frequency signal. The system includes a corrector configured to correct the tentative rotation angle calculated by the tentative angle calculator so as to eliminate a difference between an amplitude of a second frequency signal and a predetermined target amplitude thereof. The second frequency signal is actually propagated in the multiphase rotary electric machine with the second phase based on at least the superimposed quadrature-axis frequency signal.

According to a further aspect of the present invention, there is provided a system for controlling rotation of a salient rotor of a multiphase rotary electric machine in relation to a stator thereof. An output of the multiphase rotary electric machine is controlled based on an input signal thereto. The system includes a superimposing unit configured to superimpose a first frequency signal on the input signal to the multiphase rotary electric machine. The first frequency signal has a first phase and a first period. The first period is different from a period of rotation of the rotor. The system includes a saturation level detector configured to detect a saturation level of the multiphase rotary electric machine, and a rotation angle calculator. The rotation angle calculator is configured to calculate outer project between a first vector representing the first frequency signal and a second vector representing the second frequency signal, and match a result of the outer product with a target value determined based on the calculated saturation level of the multiphase rotary electric machine.

BRIEF DESCRIPTION OF THE DRAWINGS

Other objects and aspects of the invention will become apparent from the following description of embodiments with reference to the accompanying drawings in which;

FIG. 6 is a view schematically illustrating a toque maximization curve in the d-q coordinate system;

FIG. 7A is a vector diagram schematically illustrating a first case where an output-control current vector is determined such that its phase with respect to the positive direction of the d-axis is set to 90 degrees smaller than a threshold angle; and a second case where the output-control current vector is determined such that its phase with respect to the positive direction of the d-axis is set to 135 degrees greater than the threshold angle;

FIG. 7B is a view schematically illustrating a locus of the actually propagated current vector in the d-q coordinate system under the first case;

FIG. 7C schematically illustrates a locus of the actually propagated current vector in the d-q coordinate system under the second case;

FIG. 9 is a flowchart schematically illustrating a rotation angle determining task to be executed by a controller illustrated in FIG. 1;

Figure 25:
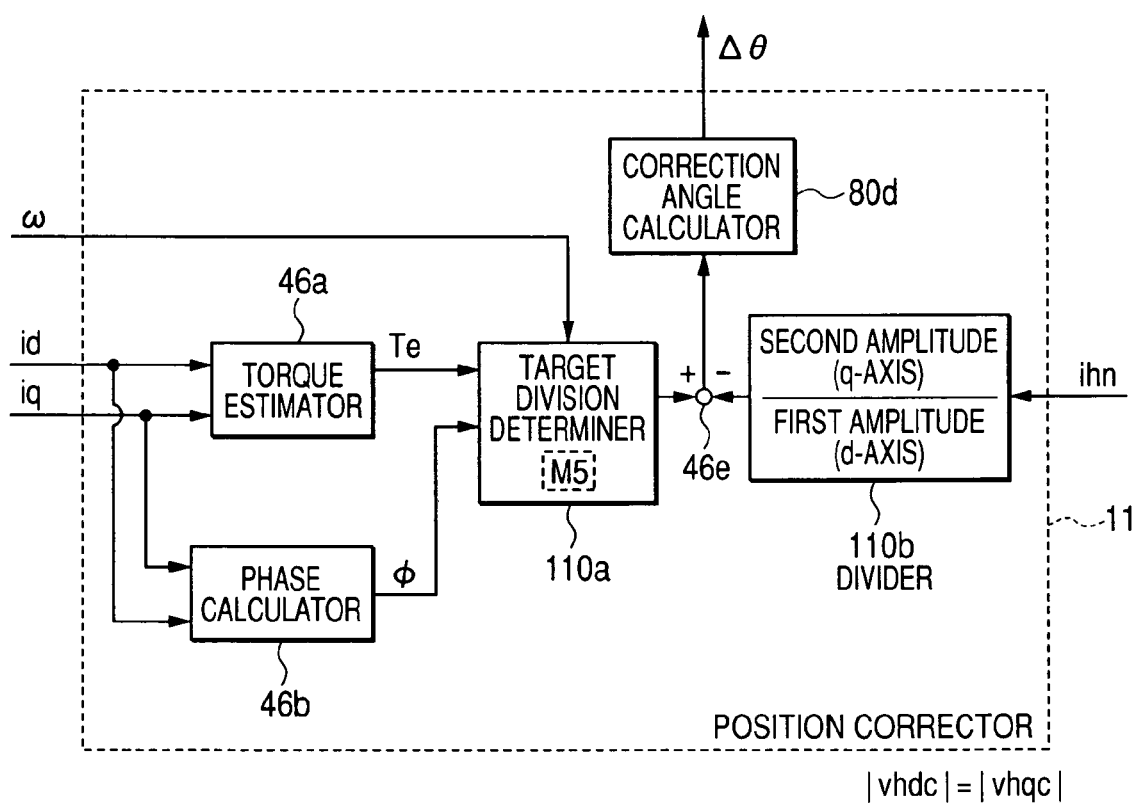
Figure 26:
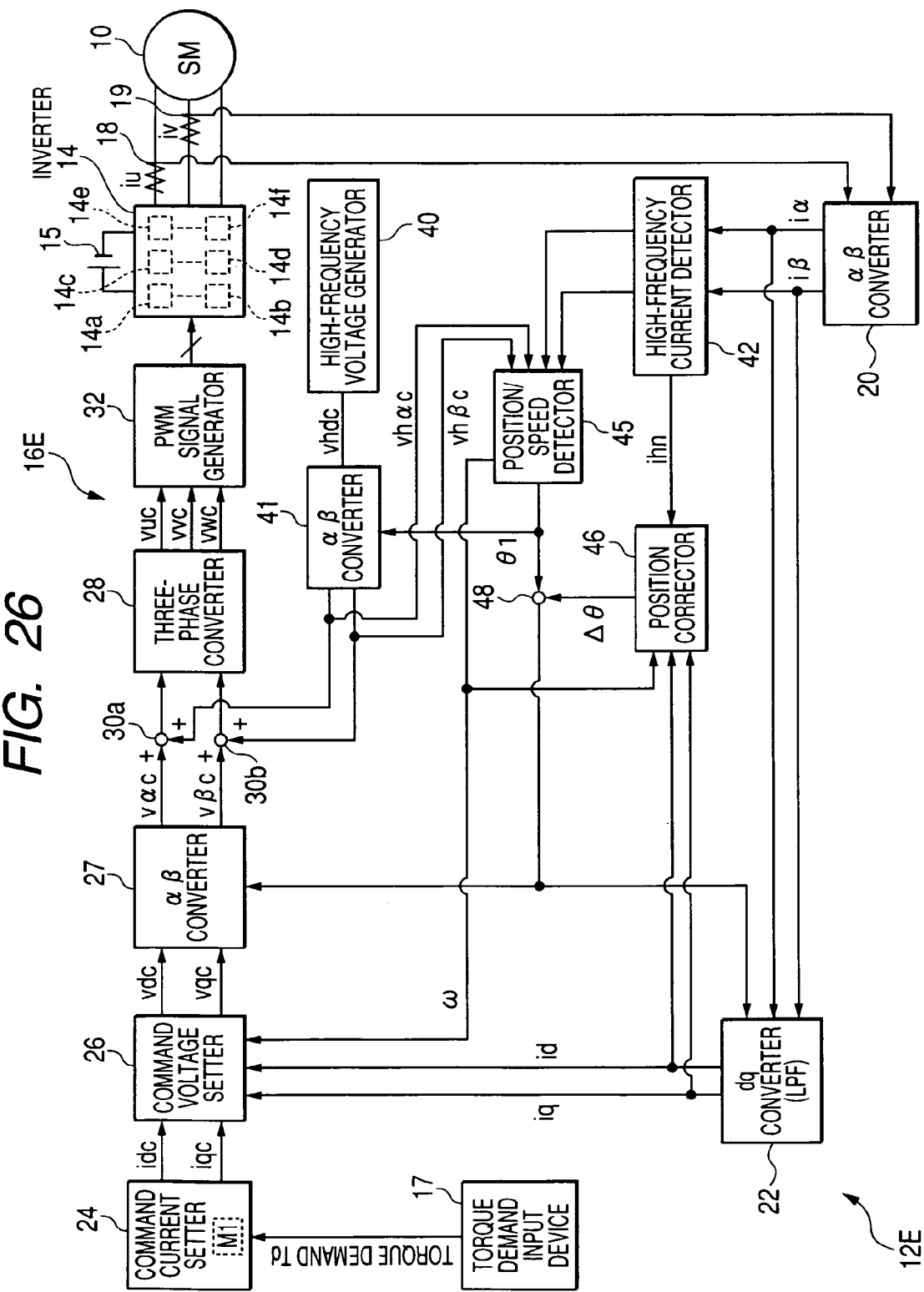
Figure 27:
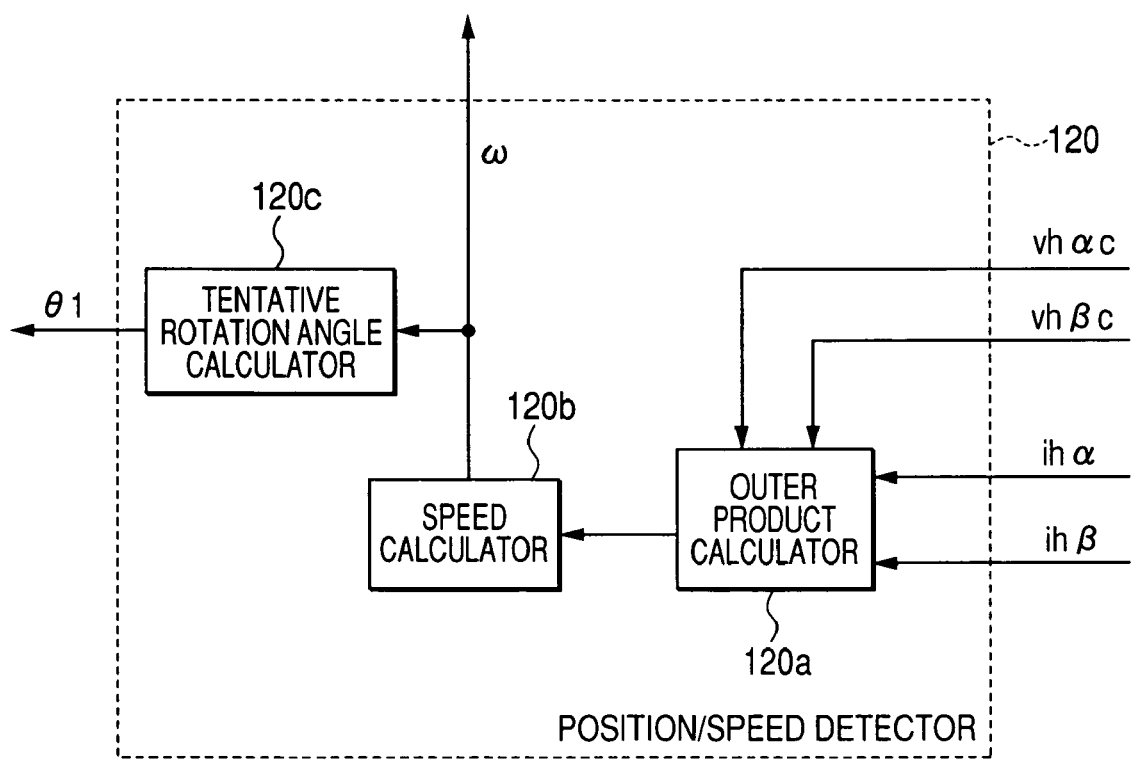
Figure 28:
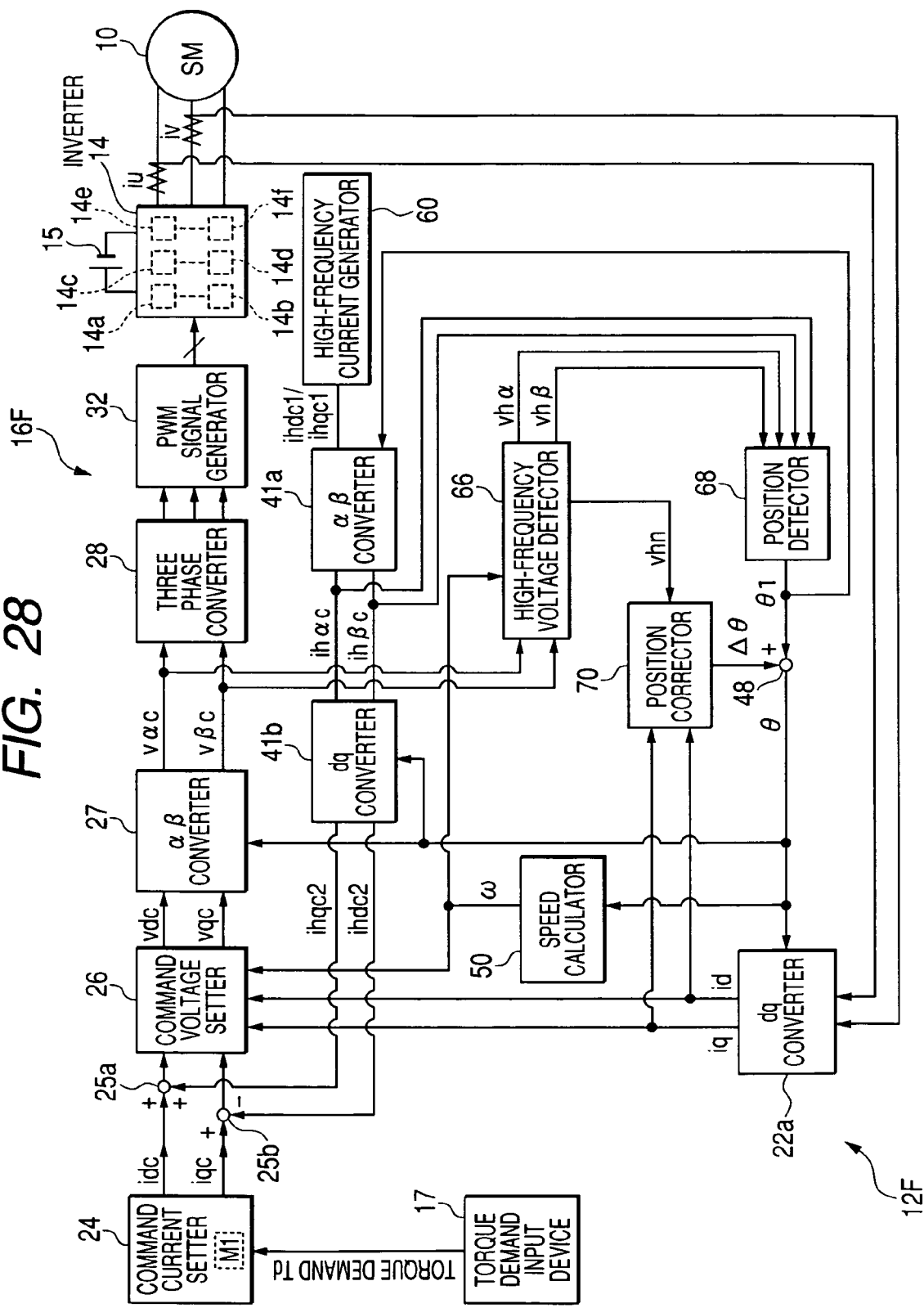
Figure 29:
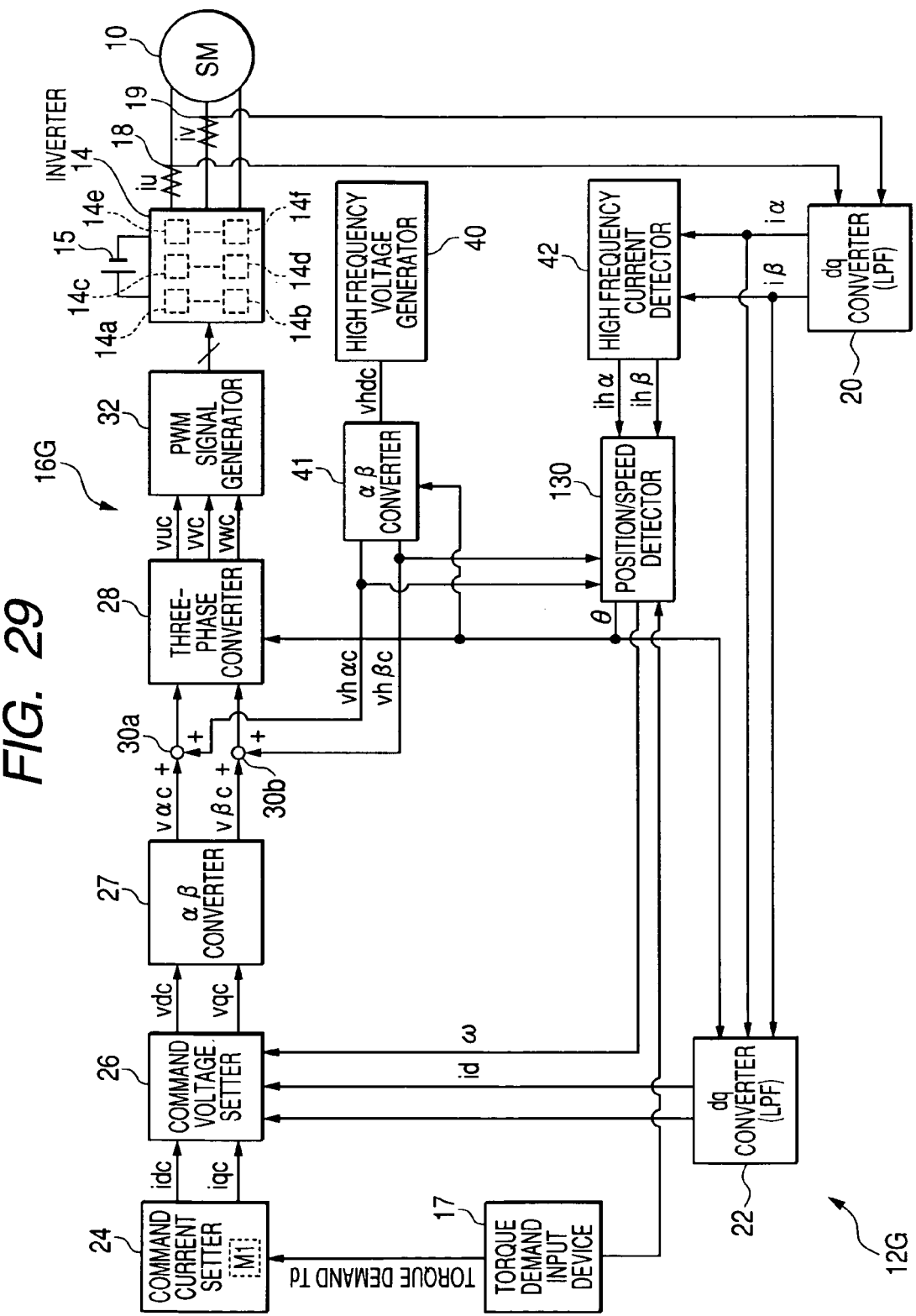
Figure 30:
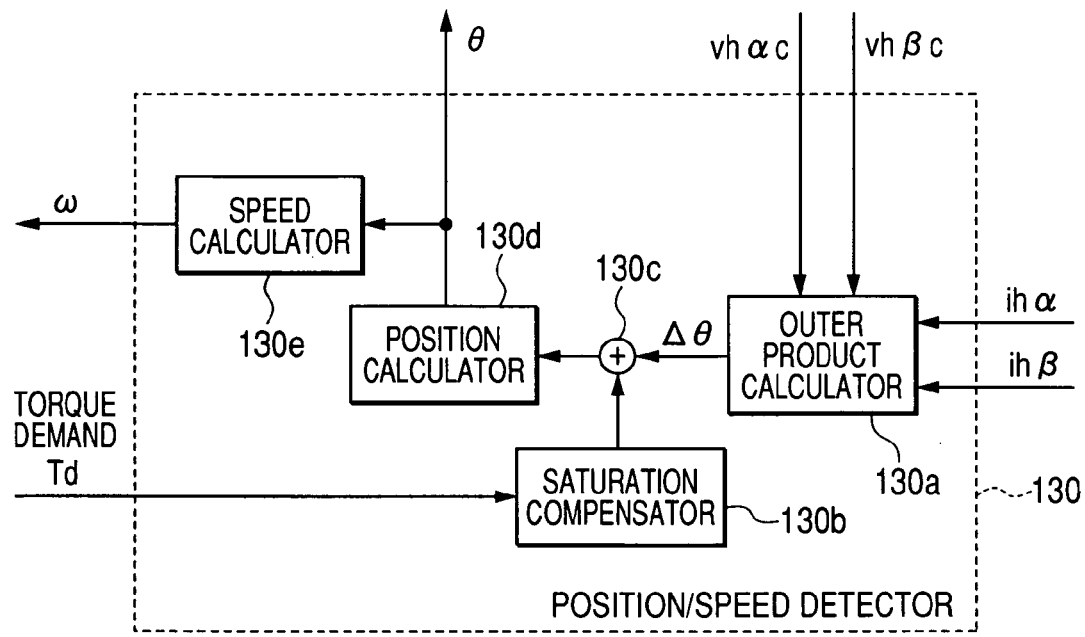
Figure 31:
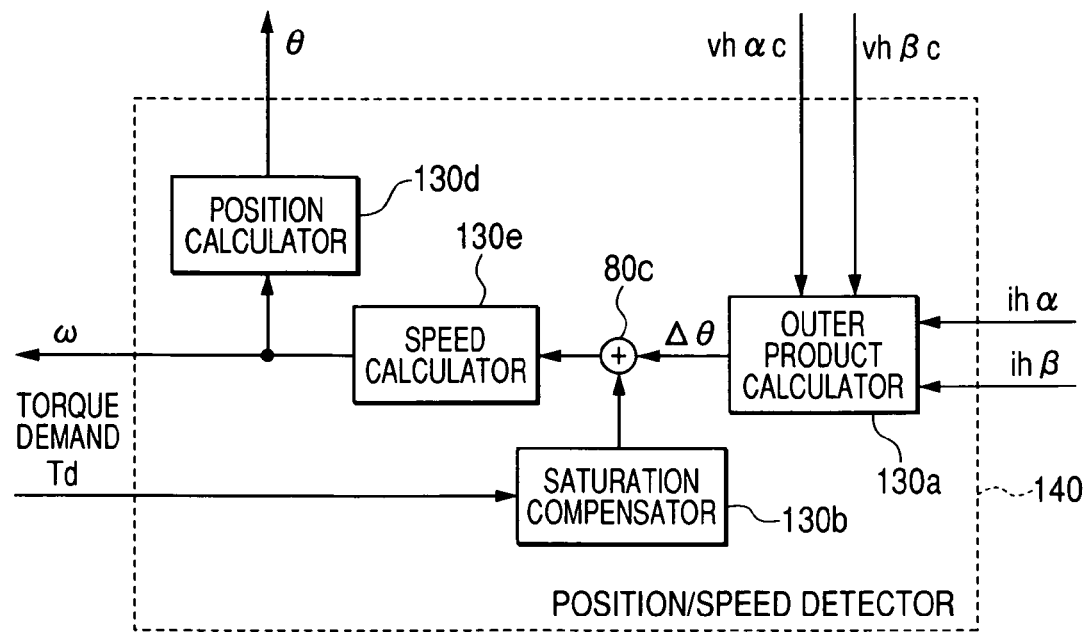
Figure 32A:
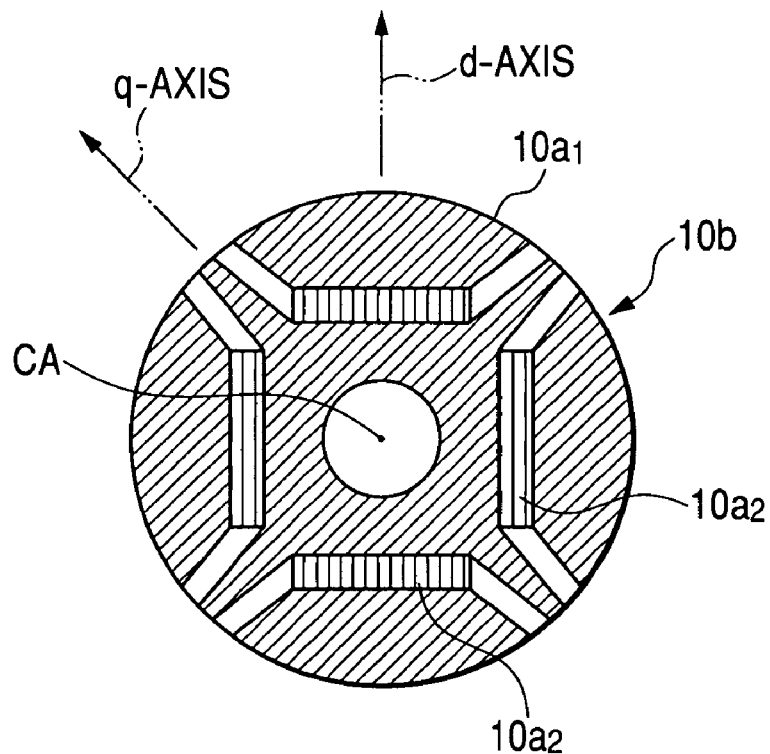
Figure 32B:
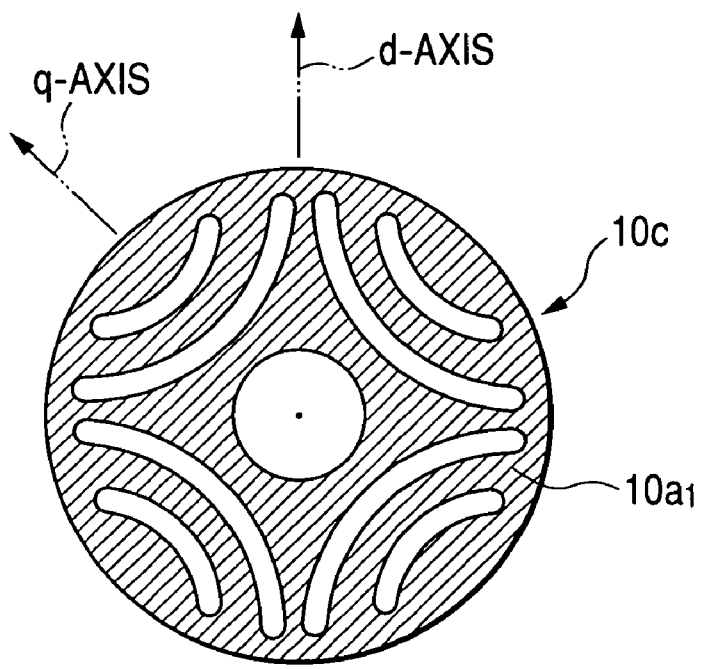

first amplitude of the first actually propagated high-frequency signal in the motor when the first high-frequency signal is superimposed on the d-axis;

second amplitude of the second actually propagated high-frequency signal in the motor when the second high-frequency signal is superimposed on the q-axis; and division of the second amplitude by the first amplite;

FIG. 25 is a block diagram schematically illustrating an example of the structure of a position corrector according to the tenth embodiment of the present invention;

FIG. 26 is a block diagram schematically illustrating an example of the structure of a position corrector according to an eleventh embodiment of the present invention;

FIG. 27 is a block diagram schematically illustrating an example of the structure of a position/speed detector illustrated in FIG. 26, FIG. 28 is a block diagram schematically illustrating an example of the structure of a position corrector according to a twelfth embodiment of the present invention;

FIG. 29 is a block diagram schematically illustrating an example of the structure of a position corrector according to a thirteenth embodiment of the present invention;

FIG. 30 is a block diagram schematically illustrating an example of the structure of a position/speed detector according to the thirteenth is embodiment of the present invention; and FIG. 31 is a block diagram schematically illustrating an example of the structure of a position/speed detector according to a fourteenth embodiment of the present invention;

FIG. 32A is a lateral cross sectional view schematically illustrating another example of the structure of the rotor of the motor according to a modification of the present invention; and FIG. 32B is a lateral cross sectional view schematically illustrating a further example of the structure of the rotor of the motor according to another modification of the present inventions

DETAILED DESCRIPTION OF EMBODIMENTS OF THE INVENTION

Embodiments of the present invention will be described hereinafter with reference to the accompanying drawings. In each embodiment, the present invention is, for example, applied to a control system for a salient three-phase motor installed in a hybrid vehicle; this three-phase motor generator is an example of various types of multiphase rotary electric machines.

First Embodiment

Figure 1:
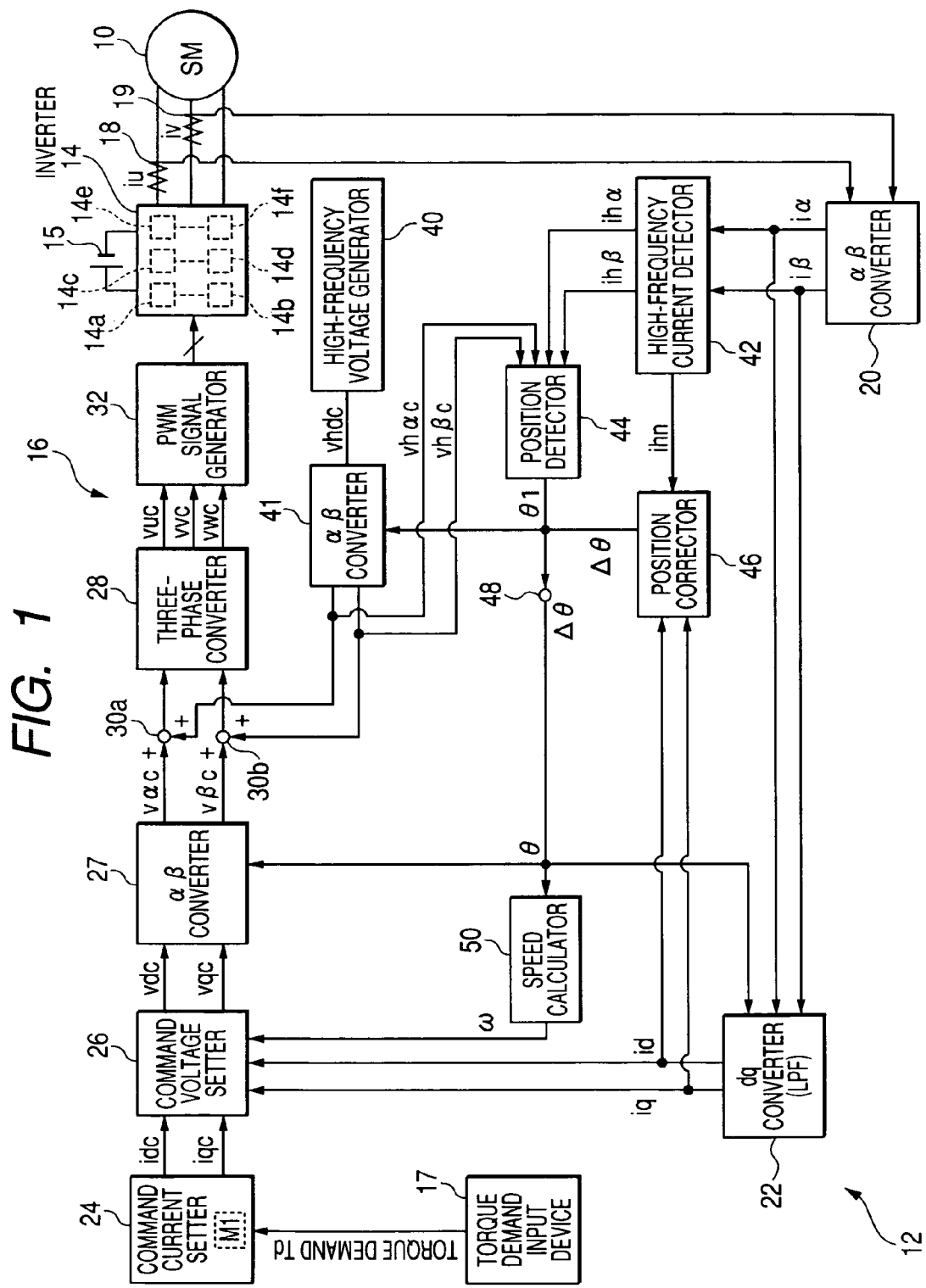
FIG. 1 is a block diagram schematically illustrates an example of the structure of a control system according to a first embodiment of the present invention.

Referring to the drawings, in which like reference characters refer to like parts in several figures, particularly to FIG. 1 there is illustrated the three-phase motor 10 and a control system 12 for controlling the motor 10 according to a first embodiment of the present invention. In the first embodiment, the three-phase motor 10 is an IPMSM (Interior Permanent Magnet Synchronous Motor).

Specifically, the three-phase motor, referred to simply as "motor" 10 is provided with a rotor 10a whose cylindrical iron rotor core 10a1 is fixedly fitted around the outer periphery of a crankshaft of an engine installed in the hybrid vehicle.

The rotor 10a has a salient structure.

Figure 2:
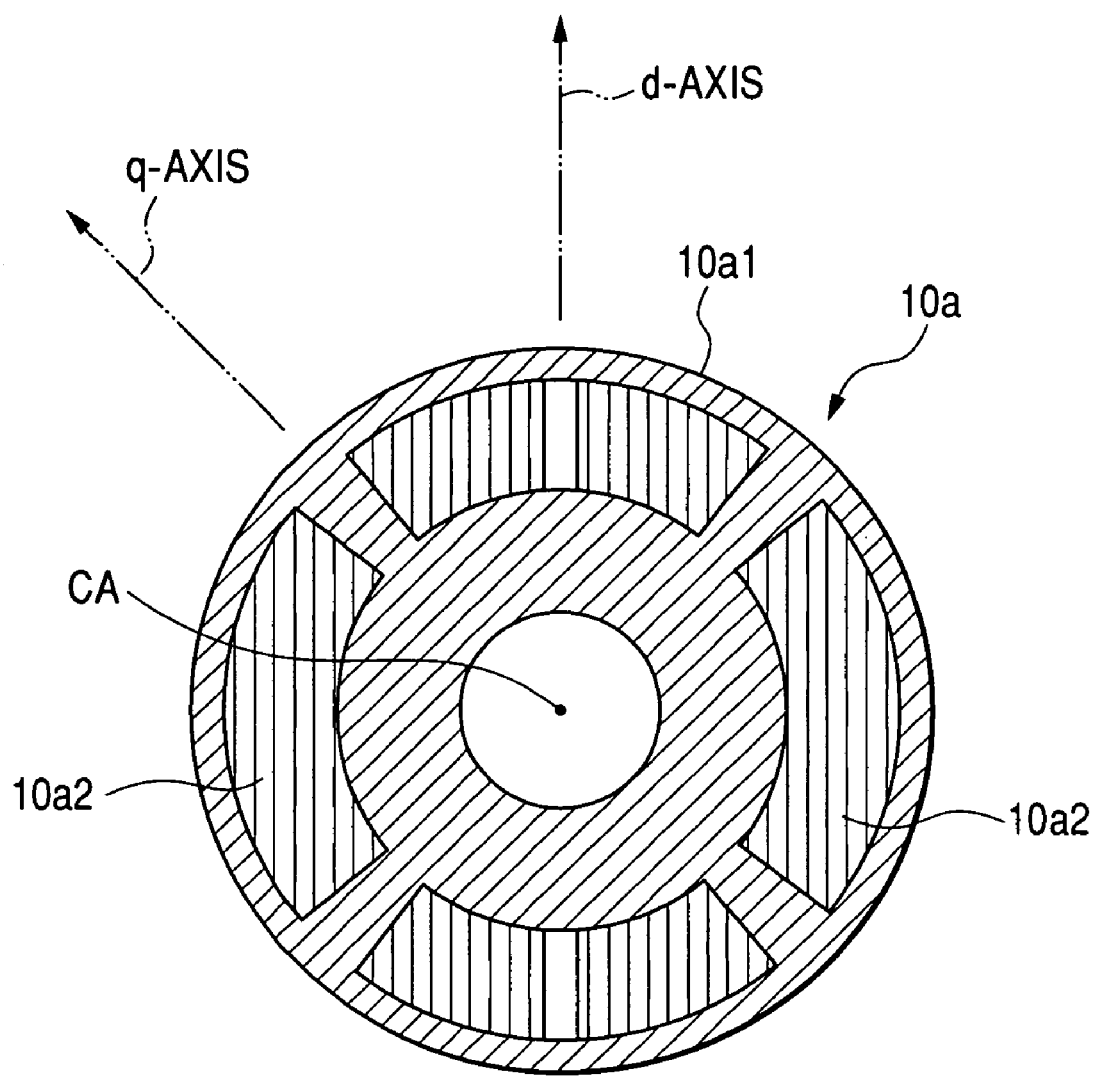
FIG. 2 is a lateral cross sectional view schematically illustrating an example of the structure of a rotor of the motor illustrated in FIG. 1.

Specifically, as illustrated in FIG. 2, the rotor 10a is provided at circumferential portions of the rotor core 10a1 with a number of such as four, permanent magnets 10a2, each having a substantially arc-shape in its lateral cross-section.

The four permanent magnets 10a2 are so embedded in the outer periphery of the rotor core 10a1 as to be symmetrically arranged with respect to center axis CA of the shaft at regular intervals in a circumferential direction of rotor core 10a1. One pair of permanent magnets 10a2 opposing each other across center axis CA has a north pole (N pole) directed radially outward away from center axis CA. Similarly, the other pair of permanent magnets 10a2 opposing each other across center axis CA has a south pole (S pole) directed radially outward away from center axis CA. Specifically, rotor 10a is formed at its outer periphery with alternately changed N and S poles at regular intervals in the circumferential direction thereof:

The rotor 10a has a direct axis (d-axis) in line with a rotor N pole center line, and has a quadrature axis (q-axis) whose phase is $\pi/2$ radian electric angle leading with respect to a corresponding d-axis during rotation of the rotor 10a.

The stator includes a stator core with, for example, an annular shape in its lateral cross section. The stator core is disposed around the outer periphery of the rotor core 10a1 such that the inner periphery of the stator core is opposite to the outer periphery of the rotor core 10a1 with a predetermined air gap.

The stator core also has a plurality of slots. The slots are formed through the stator core and are circumferentially arranged at given intervals. The stator also includes a set of three-phase windings wound in the slots of the stator.

The three-phase windings are wound in the slots such that the U-, V-, and W-phase windings are shifted by an electric angle of, for example, $2\pi/3$ radian in phase from each other.

One ends of the U-, V-, and W-phase windings are connected to each other in, for example, star configuration to constitute an individual neutral point.

On the other hand, the control system 12 includes an inverter 14, a high-voltage battery 15, a controller 16, a torque-demand input unit 17, and first and second current sensors 18 and 19.

The inverter 14 is for example designed as a three-phase inverter. The inverter 14 is composed of a first pair of series-connected switching elements 14a and 14b, a second pair of series-connected switching elements 14c and 14d, and a third pair of series-connected switching elements 14e and 14f. The inverter 14 is also composed of flywheel diodes parallely connected to the switching elements, respectively. As the switching elements, power transistors, such as IGBTs (Insulated Gate Bipolar Transistors) or MOSFETs can be preferably used, respectively.

For example, the first pair (14a and 14b), second pair (14c and 14d), and third pair (14e and 14f) of switching elements are parallely connected to each other in bridge configuration.

A connecting point through which the switching elements 14a and 14b of the first pair we connected to each other in series is connected to an output lead extending from the other end of the U-phase winding of the motor 10. Similarly, a connecting point through which the switching elements 14c and 14d of the second pair are connected to each other in series is connected to an output lead extending from the other end of the V-phase winding of the motor 10. Moreover, a connecting point through which the switching elements 14e and 14f of the third pair are connected to each other in series is connected to an output lead extending from the other end of the W-phase winding of the motor 10.

One end of the series-connected switching elements 14a and 14b of the first pair is connected to a positive terminal of the battery 15, and the other end thereof is connected to a negative terminal thereof.

Similarly, one end of the series-connected switching elements 14c and 14d of the second pair is connected to the positive terminal of the battery 15, and the other end thereof is connected to the negative terminal thereof. Moreover, one end of the series-connected switching elements 14e and 14f of the third pair is connected to the positive terminal of the battery 16, and the other end thereof is connected to the negative terminal thereof.

In other words, the battery 15 is parallely connected to the first, second, and third pairs of switching elements.

This connecting configuration between the inverter 10 and the battery 16 allows an output DC voltage of the battery 16 to be applied across both ends of the first paired series-connected switching elements 14a and 14b, both ends of the second paired series-connected switching elements 14c and 14d, and both ends of the third paired series-connected switching elements 14e and 14f.

The controller 16 consists of, for example, a driver and a normal computer circuit. The computer circuit consists of, for example, a CPU, an I/O interface, a memory unit, and peripheries as needed.

The first current sensor 18 is arranged to allow measurement of an instantaneous U-phase alternating current flowing through the U-phase winding of the stator. Similarly, the second current sensor 19 is arranged to allow measurement of an instantaneous V-phase alternating current flowing through the V-phase winding of the stator. The first and second current sensors 18 and 19 are connected to the controller 16.

Specifically, the first and second current sensors 18 and 19 are operative to send, to the controller 16, the instantaneous value of each of the U- and V-phase alternating currents as some of the motor state variables.

The controller 16 is connected to a torque-demand input device 17 installed in the hybrid vehicle. The torque-demand input device 17 is operative to input, to the controller 16, a desired toque demand (commanded torque, or request torque) of a user, such as an acceleration command of the user.

For example, an accelerator position sensor installed in the hybrid vehicle can be used as the torque demand input device 17. Specifically, the accelerator position sensor is operative to sense an actual position of an accelerator pedal of the hybrid vehicle operable by the driver and to send, as data representing a torque demand (request torque) of the driver, the sensed actual position of the accelerator pedal to the controller 16. The data representing a variable torque demand will be referred to as "torque demand data Td" hereinafter.

The switching elements 14a, 14b, 14c, 14d, 14e, and 14f have control terminals connected to the controller 16.

Functional modules of the controller 16 illustrated in FIG. 1 are equivalent to tasks to be executed thereby.

As illustrated in FIG. 1, the controller 16 includes an $\alpha\beta$ converter 20, a dq converter 22, a command-current setter 24, a command-voltage setter 26, an $\alpha\beta$ converter 27, a three-phase converter 28, first and second adders 30a and 30b, and a PWM signal generator 32. The controller 16 also includes a high-frequency voltage generator 40, an $\alpha\beta$ converter 41, a high-frequency current detector 42, a position detector 44, a position corrector 46, a third adder 48, and a speed calculator 50.

Note that the functional modules except for the PWM signal generator 32 can be implemented by one or more program modules installed in the microcomputer of the controller 16 or can be implemented by one or more hardwired-logic circuits installed therein. The PWM signal generator 32 can be implemented by one or more program modules installed in the microcomputer and a driver for driving each of the switching elements 14a to 14f individually.

The $\alpha\beta$ converter 20 works to convert the instantaneous U- and V-phase alternating currents iu and iv respectively detected by the first and second current sensors 18 and 19 into a current vector in a stationary coordinate system ($\alpha$-$\beta$ coordinate system) defined in the stator of the motor 10; in other words, into instantaneous current components i$\alpha$ and i$\beta$ on respective $\alpha$- and $\beta$-axis of the stationary coordinate system.

In the first embodiment, the $\alpha$ axis of the stationary coordinate system is defined to coincide with the U-phase instantaneous current iu in phase, and the $\beta$ axis is defined to be orthogonal to the $\alpha$ axis.

The dq converter 22 works to convert the instantaneous current components i$\alpha$ and i$\beta$ on the respective $\alpha$ and $\beta$-axes into a d-axis current component id and a q-axis current component iq in a rotating coordinate system defined by the d and q-axes of the rotor 10a of the motor 10 based on a rotation angle (rotational position) $\theta$ of the rotor 10a. More properly, the rotation angle $\theta$ is an electric angle and a rotation angle of the positive direction of the d-axis relation to the $\alpha$ axis.

The dq converter 22 also works to eliminate high-frequency components (high-frequency signal) superimposed on the d-axis current component id and q-axis current component iq; this low-pass filtering (LPF) process will be described hereinafter. Specifically, the dq converter 22 is designed to extract the d-axis current component id and q-axis current component iq of the instantaneous U-, V-, and W-phase alternating currents iu, iv, and iw flowing respectively in the U-, V-, and W-phase windings of the motor 10.

The command-current setter 24 works to set a d-axis command current idc and a q-axis command current iqc on the d and q-axes of the rotor 10a based on the torque demand data Td input from the torque demand input device 17.

The command-voltage setter 26 works to convert the d-axis command current idc and q-axis command current iqc into a d-axis command voltage vdc and a q-axis command voltage vqc on the d and q-axes of the rotor 10a, respectively.

For example, the command-voltage setter 26 executes the current-voltage converting operations using:

first feedback control, such as proportional-integral control, of the measured d-axis current component id toward the command d-axis command current idc on the d-axis;

second feedback control, such as proportional-integral control, of the measured q-axis current component iq toward the command q-axis command current iqc on the q-axis;

first decoupling control to calculate a decoupling term (component) unproportional to the d-axis current component id based on, for example, the d-axis current component id, the command d-axis command current idc, and a rotation speed $\omega$ of the rotor 10a; and second decoupling control to calculate a decoupling term (component) unproportional to the q-axis current component iq based on, for example, the q-axis current component iq, the command q-axis command current iqc, and the rotation speed $\omega$.

Note that the "decoupling control" has been well-known in the art of the present invention.

The $\alpha\beta$ converter 27 works to convert the d-axis command voltage vdc and the q-axis command voltage vqc into an $\alpha$-axis command voltage v$\alpha$c and $\beta$-axis command voltage v$\beta$c on the respective $\alpha$ and $\beta$-axes of the rotor 10a based on the rotation angle $\theta$ of the rotor 10a.

The three-phase converter 28 works to convert an output of the first adder 30a depending on the $\alpha$-axis command voltage v$\alpha$c and that of the second adder 30b depending on the $\beta$-axis command voltage v$\beta$c into a U-phase command voltage vuc, a V-phase command voltage vvc, and W-phase command voltage wuc.

The PWM signal generator 32 works to:

generate a PWM (Pulse Width Modulation) drive signals for each of the switching elements 14a to 14f required to supply the U-phase command voltage vuc, V-phase command voltage vvc, and W-phase command voltage wuc to the U-, V-, and W-phase windings of the motor 10; and drive each of the switching elements 14a to 14f individually based on a corresponding one of the PWM drive signals so as to chop a higher DC voltage of the battery 15 to thereby generate the U-phase command voltage vuc, V-phase command voltage vvc, and W-phase command voltage wuc. The three-phase AC voltage to be supplied to the U-phase winding, V-phase winding, and W-phase winding of the motor 10.

Next, the tasks to be executed by the controller 16 in order to obtain the rotation angle θ of the motor 10, which have been described as the functional modules 30a, 30b, 40, 41, 42, 44, 46, 48, and 50 in FIG. 1, will be described.

Specifically, the controller 16 is configured to superimpose, on the α-axis command voltage vαc and β-axis command voltage vβc, a high-frequency signal whose period is shorter than that of an electric angle of the rotor 10a of the motor 10.

In other words, the controller 16 is configured to superimpose, on the α-axis command voltage vαc and β-axis command voltage vβc based on the d-axis command current idc and q-axis command current iqc, a high-frequency signal whose period is shorter than the instantaneous current. The high-frequency signal being actually propagated in the motor 10 allows the controller 16 to compute the rotation angle θ of the rotor 10a of the motor 10 using the salient structure of the rotor 10a.

Specifically, because the salient structure of the rotor 10a of the motor 10, the motor 10 has the minimum inductance in the d-axis direction and the maximum inductance in the real q-axis direction. This allows current to flow easier in the d-axis of the rotor 10a than that flowing in the q-axis thereof. For this reason, the superimposed high-frequency signal is biased toward the d-axis.

Figure 3A:
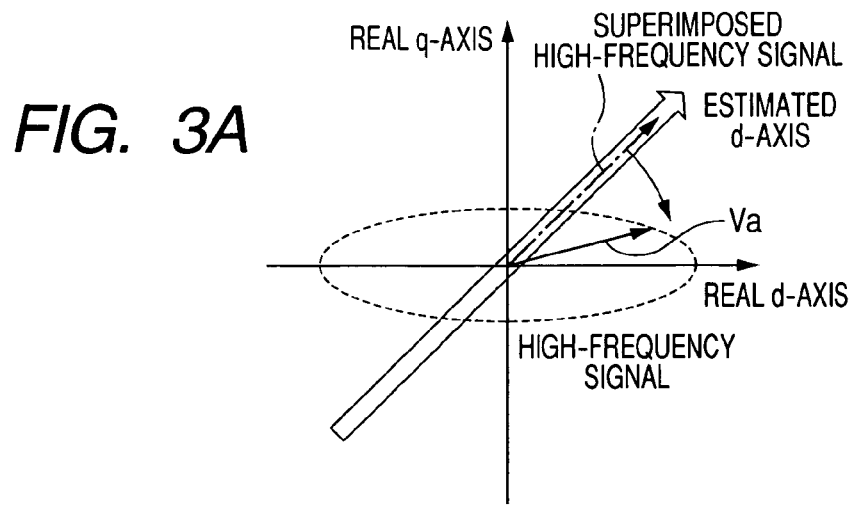
FIG. 3A is a vector diagram schematically illustrating a vector of an actually propagated high-frequency signal being biased toward a real d-axis.

For example, as illustrated in FIG. 3A, let us consider the case where an estimated d-axis leads the real d-axis in phase. In this case, when the high-frequency signal is superimposed on the α-axis command voltage vαc and β-axis command voltage vβc in the estimated d-axis (see dashed lines in FIG. 3A), a vector Va of the actually propagated high-frequency signal (see solid line in FIG. 3A) is biased toward the real d-axis so that it lags in phase with respect to the estimated d-axis.

Figure 3B:
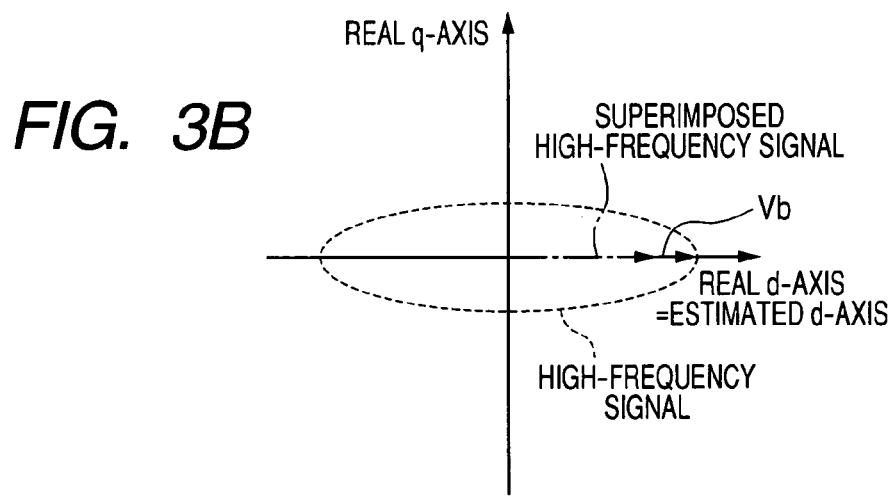
FIG. 3B is a vector diagram schematically illustrating a vector of the actually propagated high-frequency signal being matched with the real d-axis.

In contrast, as illustrated in FIG. 3B, let us consider the case where an estimated d-axis coincides with the real d-axis in phase. In this case, when the high-frequency signal is superimposed on the α-axis command voltage vαc and β-axis command voltage vβc in the estimated d-axis (see dashed lines in FIG. 3B), a vector Vb of the actually propagated high-frequency signal (see solid line in FIG. 3B) is also matched with the real d-axis so that the difference therebetween in phase becomes zero.

Figure 3C:
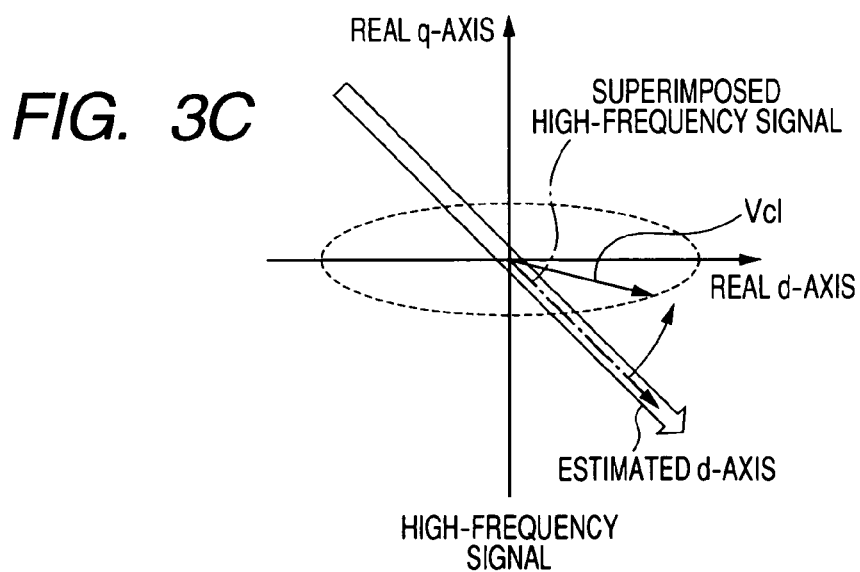
FIG. 3C is a vector diagram schematically illustrating a vector of the actually propagated high-frequency signal being biased toward the real d-axis.

In addition, as illustrated in FIG. 3C, let us consider the case where an estimated d-axis lags the real d-axis in phase. In this case, when the high-frequency signal is superimposed on the α-axis command voltage vαc and β-axis command voltage vβc in the estimated d-axis (see dashed lines in FIG. 3C), a vector Vc of the actually propagated high-frequency signal (see solid line in FIG. 3C) is biased toward the real d-axis so that it leads in phase with respect to the estimated d-axis.

These characteristics of the high-frequency signal superimposed on the α-axis command voltage vαc and β-axis command voltage vβc allow the controller 16 to reliably estimate the rotation angle θ of the rotor 10a. That is, the controller 16 executes high-frequency signal superimposition on the α-axis command voltage vαc and β-axis command voltage vβc while a vector of the actually propagated high-frequency signal is directed to an estimated d-axis. This makes possible that the high-frequency signal to be superimposed on the α-axis command voltage vαc and β-axis command voltage vβc is in agreement in phase with the actually propagated high-frequency signal, thus matching the estimated d-axis with the real d-axis.

Specifically, as illustrated in FIG. 1, the high-frequency voltage generator 40 works to generate a high-frequency voltage signal vhdc as an example of the high-frequency signal therein, and pass it to the αβ converter 41.

Figure 4A:
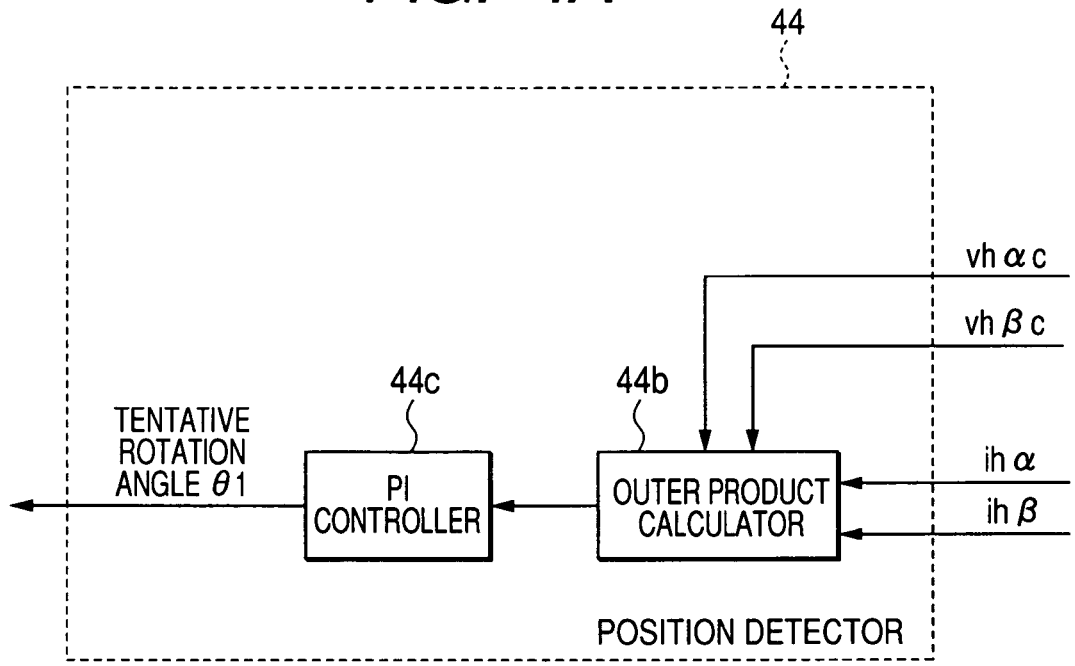
FIG. 4A is a block diagram schematically illustrating an example of the structure of a position detector illustrated in FIG. 1.

As illustrated in FIG. 4A, the αβ converter 41 works to convert the high-frequency voltage signal vhdc into an α-axis voltage component vhαc and a β-axis voltage component vhβc on the respective α and β axes of the rotor 10a based on a tentative rotation angle θ1 supplied from the position detector 44.

The αβ converter 41 also works to output the converted α-axis voltage component vhαc and β-axis voltage component vhβc to the first and second adders 30a and 30b, respectively. This allows the α-axis command voltage vαc on which the α-axis voltage component vhαc is superimposed and the β-axis command voltage vβc on which the β-axis voltage component vhβc is superimposed to be input to the three-phase converter 28.

The high-frequency current detector 42 works to extract a high-frequency current component from each of the instantaneous current components iα and iβ. Specifically, α- and β-axis current components ihα and ihβ on the α and β awes are generated by the high-frequency current detector 42 as the actually propagated high-frequency signal to the motor 10 corresponding to the actually superimposed high-frequency voltage signal vhdc.

The high-frequency current detector 42 also works to obtain an actual amplitude ihn of the actually propagated high-frequency signal (α- and β-axis current components ihα and ihβ) so as to pass it to the position corrector 46.

The position detector 44 works to calculate, based on the α-axis voltage component vhαc and β-axis voltage component vhβc output from the αβ converter 41 and the α-axis current component ihα and β-axis current component ihβ output from the high-frequency current detector 42, the tentative rotation angle θ1 so as to reduce:

a difference between the α-axis voltage component uh ac and the α-axis current component ihα; and a difference between the β-axis voltage component vhβc and the β-axis current component ihβ.

Figure 4B:
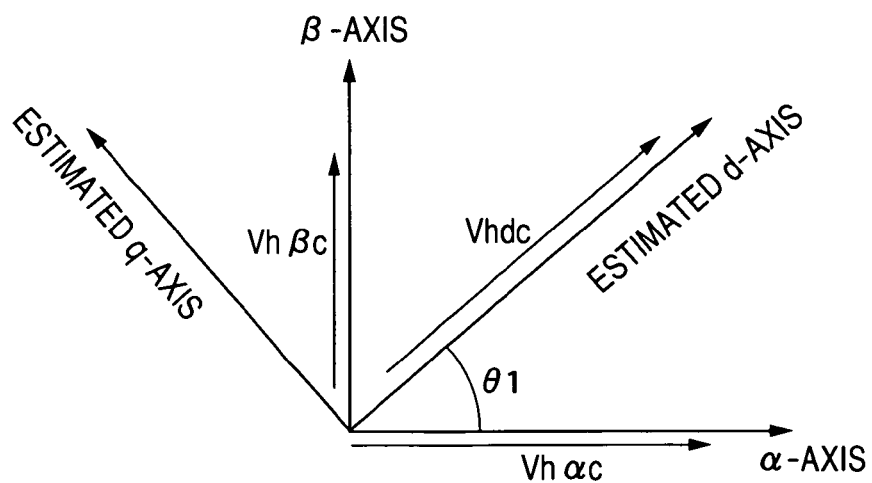
FIG. 4B is a view schematically illustrating conversion between a d-q coordinate system and α-β coordinate system.

For example, as schematically illustrated in FIG. 4B, the position detector 44 is composed of an outer product calculator 44b and a PI controller 44c.

The outer product calculator 44b works to calculate an outer product between the vector signal of the high-frequency voltage signal vhdc (the α-axis voltage component vhαc and β-axis voltage component vhβc) and the vector signal consisting of the α-axis current component ihα and β-axis current component ihβ. The outer product serves as a parameter having a correlation with a difference in phase between the high-frequency voltage signal vhdc and each of the α-axis current component ihα and β-axis current component ihβ.

For this reason, making the outer product become zero allows the high-frequency voltage signal vhdc output from the high-frequency voltage generator 40 to be superimposed on the α-axis command voltage vαc and β-axis command voltage vβc in a direction in which the inductance is minimum, such as the real d-axis direction.

In the position detector 44 according to the first embodiment, the PI controller 44c works to calculate the sum of a proportional term and an integral term based on an output of the outer product calculator 44b, thus outputting the calculated sum of the proportional term and integral term as the tentative rotation angle θ1 to be actually used for the high-frequency voltage superimposition.

In accordance with the tentative rotation angle θ1, the high-frequency voltage signal vhdc is superimposed, by the αβ converter 41 and the first and second adders 30a and 30b, on the α-axis command voltage vαc and the β-axis command voltage vβc in a direction in which the inductance is estimated to be minimum. For this reason, when the high-frequency voltage signal vhdc is superimposed on the α-axis command voltage vαc and the β-axis command voltage vβc in a direction in which the inductance is actually minimum; the estimated d-axis of the high-frequency voltage signal vhdc can be matched with the real d-axis, and therefore, the tentative rotation angle θ1 to be actually used for the high-frequency voltage superimposition can be matched with the actual rotation angle of the rotor 10a.

Turning now to an output torque of the motor 10, increase in the output torque thereof may invite partially magnetic saturation in the motor 10 depending on how a current vector actually propagated in the motor 10 flows in the motor 10. The invitation of the partially magnetic saturation will be described with reference to FIGS. 5A, 5B, and 5C.

As illustrated in FIG. 1A, it is assumed that the high-frequency voltage signal vector vhdc to be superimposed on the α-axis command voltage vαc and β-axis command voltage vβc is changed with its amplitude being constant such that the locus of the high-frequency voltage signal vhdc propagated in the rotating coordinate system (d-q coordinate system) draws a circle.

Figure 5A:
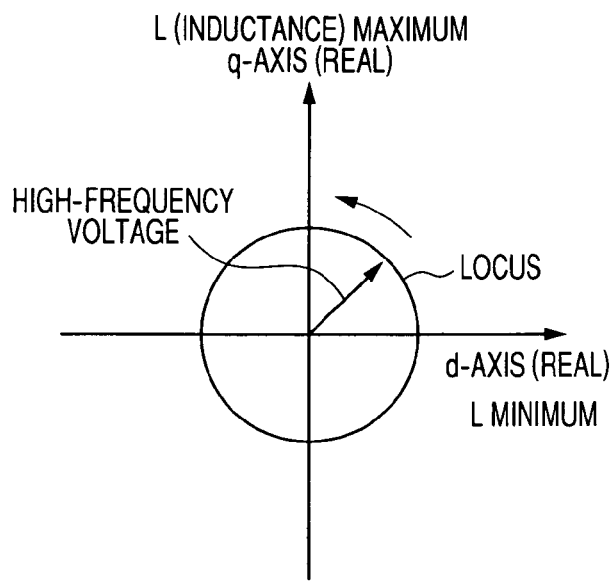
FIG. 5A is a vector diagram schematically illustrating a locus of a vector of a superimposed high-frequency signal in the d-q coordinate system.
Figure 5B:
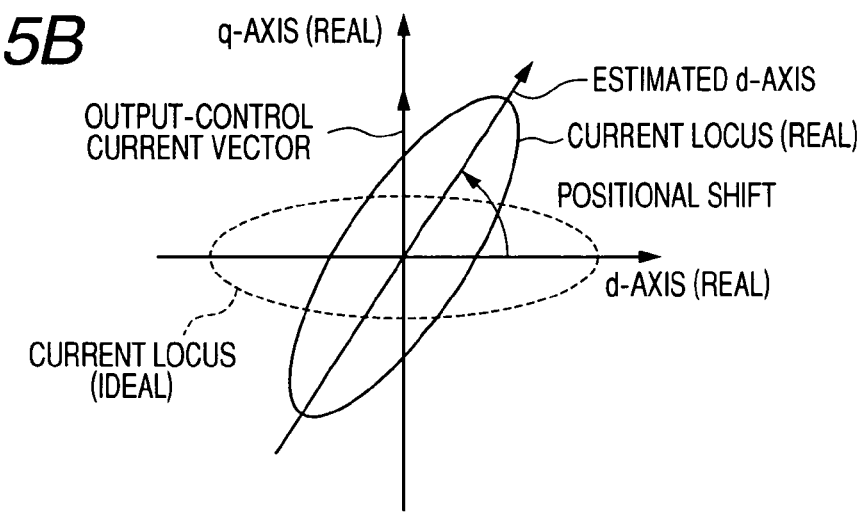
FIG. 5B is a vector diagram schematically illustrating a locus of the actually propagated current vector under the assumption illustrated in FIG. 5A when a current vector consisting of a d-axis command current and a q-axis command current for control of an output of the motor is directed along the q-ads.
Figure 5C:
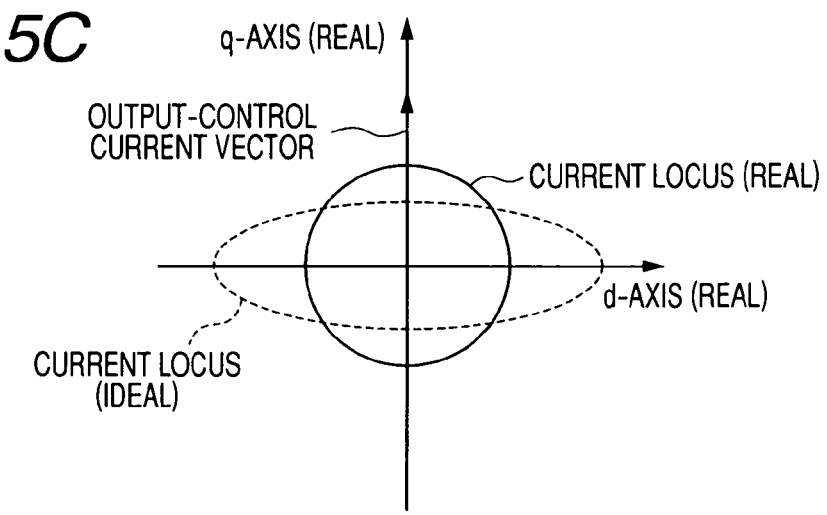
FIG. 5C is a vector diagram schematically illustrating another locus of the actually propagated current vector under the assumption illustrated in FIG. 5A when the current vector consisting of the d-axis command current and the q-ads command current for control of an output of the motor is directed along the q-axis.

FIGS. 5B and 5C schematically illustrate a locus of an actually propagated current vector under the assumption illustrated in FIG. 5A when a current vector consisting of the d-axis command current idc and q-axis command current iqc for control of the output of the motor 10 is directed along the q-axis; this current vector will be referred to as "output-control current vector" hereinafter.

Specifically, as illustrated in FIG. 5B, when the output-control current vector is directed along the q-axis, a direction in which the inductance is minimum is shifted from the d-axis toward the direction of the output-control current vector. This causes the actually propagated current vector in the motor 10 is biased toward the output-control current vector.

On the other hand, as illustrated in FIG. 5C, when the output-control current vector is directed along the c-axis, the actually propagated current vector in the motor 10 is changed with its amplitude being constant such that the inductance has the same magnitude in any direction of the actually propagated current vector.

The greater the output torque of the motor 10 is, the more the first phenomenon illustrated in FIG. 5B tends to occur as compared with the second phenomenon illustrated in FIG. 5C.

Appearance of the first phenomenon illustrated in FIG. 5B may disable the tentative rotation angle θ1 to be directed along the d axis. Appearance of the second phenomenon illustrated in FIG. 5C may make it difficult for the controller 16 to use the rotation-angle estimating method based on the shift of the inductance in the actually propagated current vector from that in the d-axis.

The controller 16 according to the first embodiment is therefore configured to address appearance of either the first phenomenon or the second phenomenon set forth above.

First, in order to address the second phenomenon, the command-current setter 24 is configured to set, based on the input value of torque demand data Td from the torque demand input device 17, the d-axis command current idc and q-axis command current iqc except for values in which the salient characteristic of the motor 10 (rotor 10a) is destroyed.

Specifically, the command-current setter 24 has stored therein a map M1. The map M1 represents a torque maximization curve C1 in the d-q coordinate system; this curve has been determined by simulations and/or tests.

As illustrated in FIG. 6, the toque maximization curve C1 smoothly extending from a dashed line C1a to a solid line C1b represents maximum torque of the motor 10 as a function of d-axis command current and q-axis command current with minimum power consumption being kept. In other words, determination of a value of the d-axis command current and that of the q-axis command current corresponding thereto on the torque maximization curve C1 as the d-axis command current idc and q-axis command current iqc allows the maximum torque of the motor 10 to be obtained with minimum power consumption being kept.

However, the smaller an angle between the q-axis and a current vector consisting of the d-axis command current idc and q-axis command current iqc is, the more the occurrence of the second phenomenon increases in frequency.

In the first embodiment, therefore, a part C1a of the torque maximization curve C1, which is close to the q-axis and illustrated by the dashed line, is corrected to a curve C2 illustrated by a chain double-dashed line. A current vector determined by a point on the curve C2 is biased toward the negative direction of the d-axis as compared with a current vector determined by a point on the part C1a of the torque maximization curve C1.

Specifically, in the first embodiment, a phase (phase angle) of the output-control current vector depending on the input value of the torque demand data Td with respect to the positive direction of the d-axis may be smaller than a predetermined threshold angle P.

In this case, the command-current setter 24 is configured to set a corrected output-current control vector consisting of values of d- and q-axis command currents idc and iqc on the curve C2; the magnitude of this corrected output-current control vector is matched with that of the output-control current vector corresponding to the torque maximization curve C1. This can prevent the second phenomenon illustrated in FIG. 5C from occurring. The reason will be described as follows.

FIG. 7A schematically illustrates.

a first case where the output-control current vector is determined such that its phase with respect to the positive direction of the d-axis is set to 90 degrees smaller than the threshold angle P; and a second case where the output-control current vector is determined such that its phase with respect to the positive direction of the d-axis is set to 135 degrees greater than the threshold angle P.

FIG. 7B schematically illustrates the locus of the actually propagated current vector in the rotating coordinate system (d-q coordinate system) under the first case. FIG. 7C schematically illustrates the locus of the actually propagated current vector in the d-q coordinate system under the second case.

As seen in the illustration of FIG. 7B, when the output-control current vector is determined such that its phase with respect to the positive direction of the d-axis is set to 90 degrees lower than the predetermined threshold angle P, the actually propagated current vector in the d-q coordinate system is substantially unbiased.

At that time as seen in the illustration of FIG. 7C, the output-control current vector is changed such that its phase with respect to the positive direction of the d-axis is set to 135 degrees higher than the predetermined threshold angle P while the magnitude of the output-control current vector is kept unchanged. This allows the actually propagated current vector in the d-q coordinate system to be biased.

As described above, the shift of the output-control current vector from a current vector defined by the torque maximization curve C1 toward the negative direction of the d-axis allows the inductance to be changed depending on its direction in the d-q coordinate system. This makes it possible to reliably estimate the rotation angle of the rotor 10a based on the difference of the inductance depending on its direction.

Next, a method of addressing occurrence of the first phenomenon will be described hereinafter.

Figure 8A:
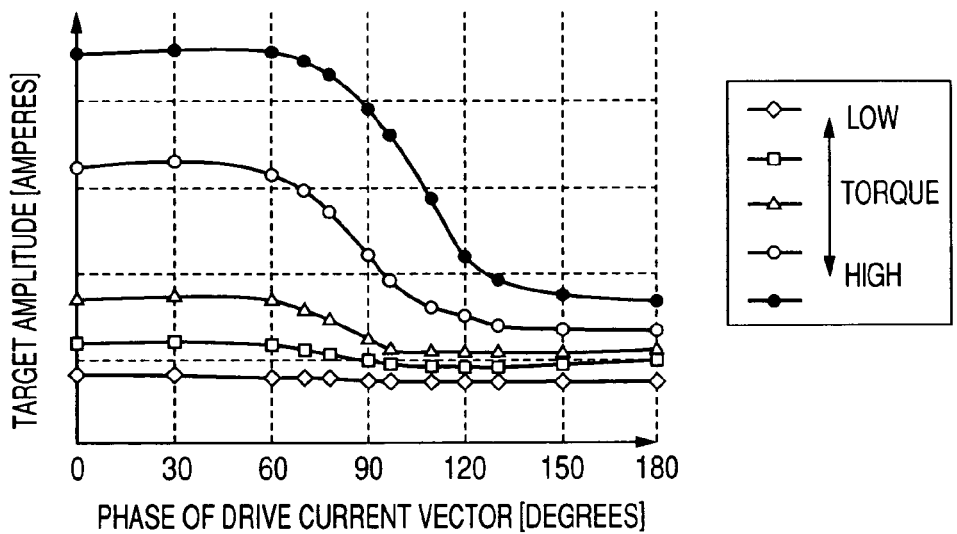
FIG. 8A is a graph schematically illustrating a relationship between output torque of the motor, phase of a drive current vector for output control, and target amplitude of the actually propagated high-frequency signal in the motor 10.

FIG. 8A schematically illustrates a relationship between output torque of the motor 10, phase (phase angle) of a drive current vector for output control consisting of the d-axis current component id and q-axis current component iq, and target amplitude of the actually propagated high-frequency signal (current) in the motor 10.

More particularly, the relationship illustrated in FIG. 8A has been determined by simulations and/or tests while superimposing the high-frequency signal (voltage) on the α-axis command voltage vαc and β-axis command voltage vβc in a direction in which the inductance in the motor 10 is minimum.

As illustrated in FIG. 8A, the target amplitude of the actually propagated high-frequency current in the motor 10 varies with variation of the phase angle of the drive current vector and that of the output torque of the motor 10. For this reason, when a real amplitude of the actually propagated high-frequency current is shifted from the target amplitude, it is determined that the controller 16 recognizes a phase angle of the drive current vector deviated from an actually phase angle thereof.

In other words, the controller 16 recognizes, as the actual rotation angle of the rotor 10a, another rotation angle (precisely, electric angle) deviated therefrom.

For this reason, the controller 16 is equipped with a position corrector 46 for correcting the tentative rotation angle θ1 so as to reduce a difference between the actual amplitude of the actually propagated high-frequency signal and the target amplitude.

Figure 8B:
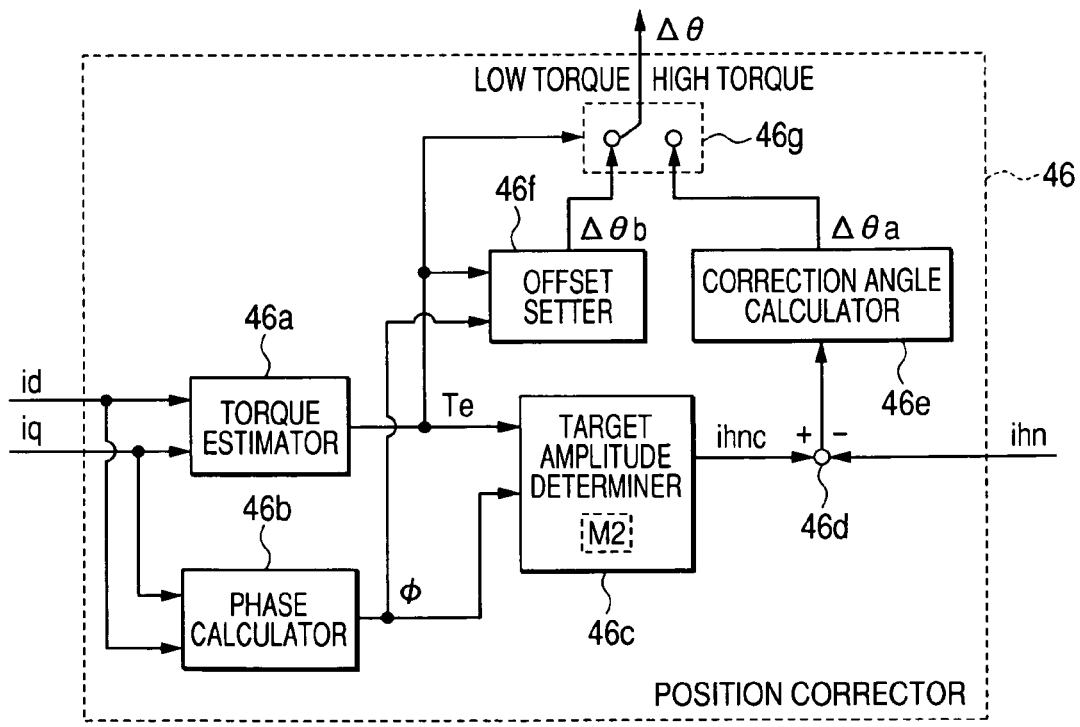
FIG. 8B is a block diagram schematically illustrating an example of the structure of a position corrector according to the first embodiment.

FIG. 8B schematically illustrates an example of the structure of the position corrector 46 according to the first embodiment.

The position corrector 46 consists of a torque estimator 46a, a phase calculator 46b, a target amplitude determiner 46c, a difference calculator 46d, a correction angle calculator 46e, an offset setter 46f, and a selector 46g.

The torque estimator 46a works to calculate an estimated output torque Te of the motor 10 based on the d-axis current component id and q-axis current component iq.

The phase calculator 46b works to calculate the phase (phase angle) φ of the drive current vector flowing in the motor 10 and consisting of the d-axis current component id and q-axis current component iq with respect to the positive direction of the d-axis.

The target amplitude determiner 46c has stored therein a map M2 representing the relationship illustrated in FIG. 8A as a data table and/or a program; this relationship has been determined by simulations and/or tests.

The target amplitude determiner 46c works to reference the map M2 based on the estimated output torque Te and the calculated phase φ of the drive current vector so as to extract a target amplitude ihnc of the actually propagated high-frequency signal (the α- and β-axis current components ihα and ihβ) associated with the estimated output torque Te and the calculated phase φ of the drive current vector.

The difference calculator 46d works to calculate the difference between the actual amplitude ihn of the actually propagated high-frequency signal (α- and β-axis current components ihα and ihβ) passed from the high-frequency detector 42 and the target amplitude ihnc thereof.

The correction angle calculator 46e works to calculate a first correction angle Δθa for the estimated rotation angle θ1 based on the difference calculated by the difference calculator 46d so as to make the actual amplitude ihn of the actually propagated high-frequency signal follow the target amplitude ihnc thereof. For example, the correction angle calculator 46e works to:

calculate a proportional term and an integral term based on the calculated difference between the actual amplitude ihn and the target amplitude ihnc of the actually propagated high-frequency signal; and calculate the first correction angle Δθa for the estimated rotation angle θ1 based on the sum of the proportional term and the integral term.

The offset setter 46f works to calculate a second correction angle Δθb for the estimated rotation angle θ1 based on the estimated output torque Te and the calculated phase φ of the drive current vector.

The second correction angle Δθb can be used in the range of the low output torque of the motor 10. In the range of the low output torque of the motor 10) because the signal-to-noise ratio (S/N ratio) of the actually propagated high-frequency signal becomes comparatively low, the accuracy of calculation of the first correction angle Δθ a based on the difference between the actual amplitude in and the target amplitude ihnc of the actually propagated high-frequency signal may be reduced.

However, in this case, because, in the range of the low output torque of the motor 10, no magnetic saturation is probably invited in the motor 10.

Thus, in the range of the low output torque of the motor 10, it is possible to use the tentative rotation angle θ1 of the rotor 10a so as to calculate the rotation angle θ thereof.

In this case, the tentative rotation angle θ1 is changed with change in the output torque Te and in the phase φ of the drive current vector. Thus, the second correction angle Δθ b for the estimated rotation angle θ1 can be obtained based on the estimated output torque Te and the calculated phase C of the drive current vector in accordance with a previously determined relationship between output torque of the motor 10, phase of the drive current vector, and rotation angle θ1 of the rotor 10a.

The selector 46g works to select, based on the estimated output torque Te, the second correction value Δθb in the range of the low output torque of the motor 10 as a definite correction angle Δθ for correcting the tentative rotation angle θ1. The selector 46g also works to select, based on the estimated output torque Te, the first correction value Δθa in the range of the high output torque of the motor 10 as the definite correction angle Δθ for correcting the tentative rotation angle θ1.

The third adder 48 works to add the definite correction angle Δθ to the tentative rotation angle θ1, correct the tentative rotation angle θ1, and feed the corrected rotation angle θ to the speed calculator 50. The speed calculator 50 works to temporally differentiating the corrected rotation angle θ so as to calculate the rotation speed ω of the motor 10 as the temporally differentiated rotation angle θ.

FIG. 9 schematically illustrates a rotation angle determining task set forth above to be executed by the controller 16, especially, its microcomputer, in accordance with at least one program stored in a memory of the microcomputer. The rotation angle determining task is repeatedly executed by the microcomputer of the controller 16 at predetermined regular intervals.

When launching the program, the microcomputer of the controller 16 extracts the high-frequency signal (high-frequency current components ihα and ihβ) from the respective instantaneous current components iα and iβ as the actually propagated high-frequency signal in step S10.

Next, the microcomputer of the controller 16 calculates, based on the α-axis voltage component vhαc and β-axis voltage component vhβc and the α-axis current component ihα and β-axis current component ihβ, the tentative rotation angle θ1 in step S12.

The microcomputer of the controller 16 references the map M2 based on the estimated output torque Te and the calculated phase f) of the drive current vector so as to extract the target amplitude ihnc of the actually propagated high-frequency signal (the α- and β-axis current components ihα and ihβ) associated with the estimated output torque Te and the calculated phase φ of the drive current vector in step S14.

The microcomputer of the controller 16 detects the actual amplitude ihn of the actually propagated high-frequency signal (α- and β-axis current components ihα and ihβ) in step S16.

Subsequently, in step S18, the microcomputer of the controller 16 calculates the first correction angle Δθa for the estimated rotation angle θ1 based on the difference between the actual amplitude ihn of the actually propagated high-frequency signal (α- and β-axis current components ihα and ihβ) and the target amplitude ihnc thereof so as to make the actual amplitude ihn of the actually propagated high-frequency signal follow the target amplitude ihnc thereof.

In step S20, the microcomputer of the controller 16 calculates the second correction angle Δθb for the estimated rotation angle θ1 based on the estimated output torque Te and the calculated phase φ of the drive current vector.

In step S22, the microcomputer of the controller 16 selects, based on the estimated output torque Te, the second correction angle Δθ b in the range of the low output torque of the motor 10 as the definite correction angle Δθ for correcting the tentative rotation angle θ1. The microcomputer of the controller 16 also selects, based on the estimated output torque Te, the first correction value Δθa in the range of the high output torque of the motor 10 as the definite correction angle Δθ for correcting the tentative rotation angle θ1.

In step S24, the microcomputer of the controller 16 adds the definite correction angle Δθ to the tentative rotation angle θ1 to thereby calculate the corrected rotation angle θ as the sum of the definite correction angle Δθ and the tentative rotation angle θ1.

The rotation angle determining task allows the rotation angle θ to be determined with high accuracy even if magnetic saturation is invited in the motor 10.

Figure 10:
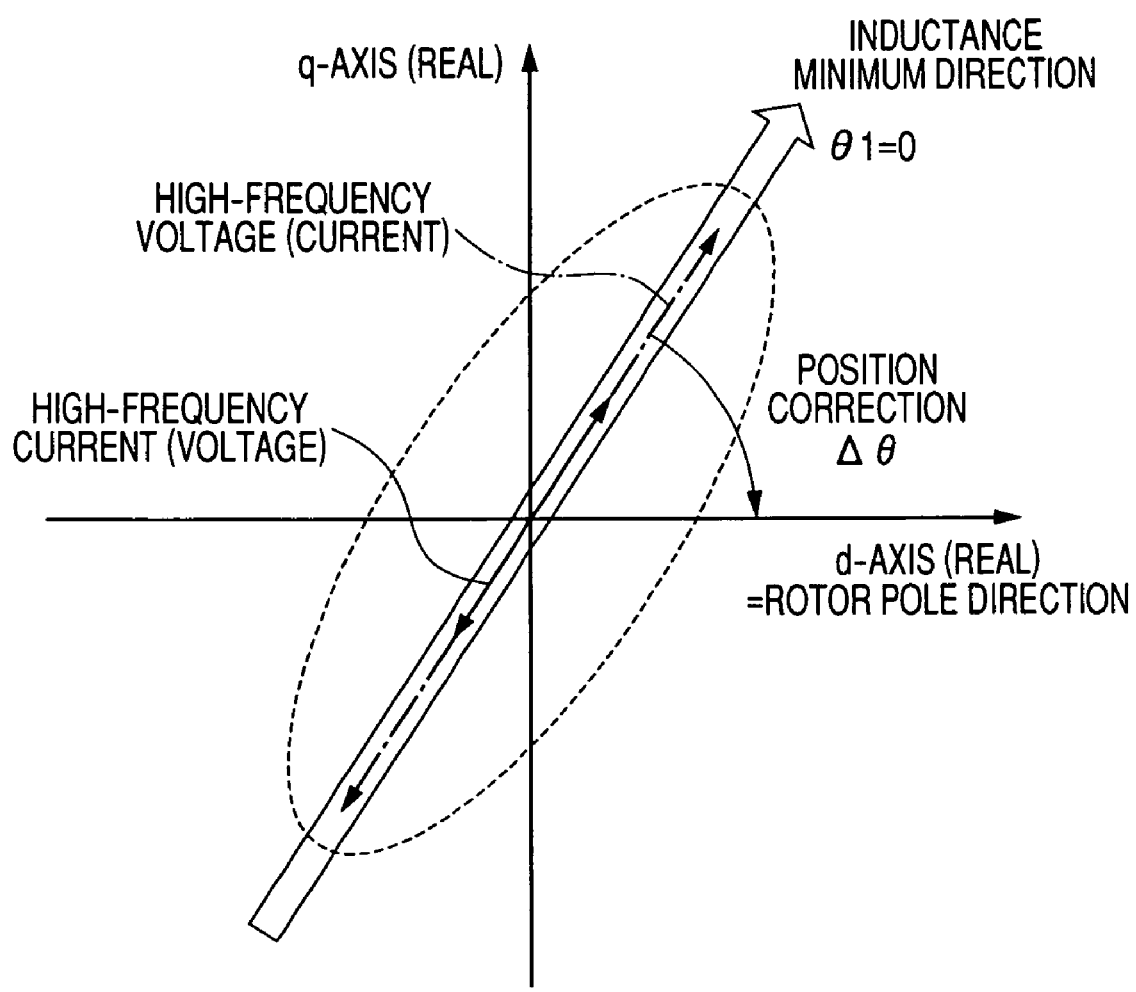
FIG. 10 is a vector diagram schematically illustrating that a correction angle allows a direction in which the tentative rotation angle becomes zero to be shifted toward the d-axis according to the first embodiment.

Specifically, as illustrated in FIG. 10, occurrence of magnetic saturation causes the inductance minimum direction to be deviated from the real d-axis, so the direction in which the tentative rotation angle θ1 becomes zero is shifted from the real d-axis.

However, in the first embodiment, correction of the tentative rotation angle θ1 by the correction angle Δθ allows the inductance minimum direction to be matched with the real d-axis.

As described above, the control system 12 according to the first embodiment provides the following first to twelfth effects as follows.

Specifically, the controller 16 determines the rotation angle θ of the rotor 10a so as to reduce the difference between the target amplitude and the actual amplitude of the actually propagated high-frequency signal (α- and β-axis current components ihα and ihβ). This properly obtains, as the first effect, information associated with the rotation angle δ of the rotor 10a even if magnetic saturation is invited in the motor 10.

The controller 16 determines the target amplitude of the actually propagated high-frequency signal (α- and β-axis current components ihα and ihβ) based on the phase φ of the drive current vector flowing in the motor 10 for control of the motor output and consisting of the d-axis current component id and q-axis current component iq. Because the amplitude of the actually propagated high-frequency signal is changed with change in the phase φ of the drive current vector, it is possible to properly determine, as the second effect, the target amplitude of the actually propagated high-frequency signal depending on the phases of the drive current vector.

In addition, because the output-control current vector consisting of the d-axis command current idc and q-axis command current iqc collates with the drive current vector, it is also possible to properly determine the target amplitude of the actually propagated high-frequency signal depending on a phase of the output-control current vector.

The controller 16 determines the target amplitude of the actually propagated high-frequency signal (α- and β-axis current components ihα and ihβ) based on the estimated output torque Te of the motor 10. Because the amplitude of the actually propagated high-frequency signal is changed with change in the output torque of the motor 10, it is possible to properly determine, as the third effect, the target amplitude of the actually propagated high-frequency signal depending on the estimated output torque Te of the motor 10.

In other words, the amplitude of the actually propagated high-frequency signal depends on change in various parameters of the operating conditions of the motor 10, such as the phase c of the drive current vector flowing in the motor 10 for control of the motor output, the output torque of the motor 10, the RPM of the motor 10, and the like. Thus, in the first embodiment, it is possible to determine the target amplitude of the actually propagated high-frequency signal depending on at least one of the parameters of the operating conditions of the motor 10.

The controller 16 calculates the tentative rotation angle θ1 based on the directions of the α- and β-axis current components ihα and ihβ of the actually propagated high-frequency signal biased toward the minimum inductance direction in the d-q coordinate system. The controller 16 corrects the tentative rotation angle θ1 based on the map M2 representing the relationship between output torque of the motor 10, phase of the drive current vector for output control consisting of the d-axis current component id and q-axis current component id, and target amplitude of the actually propagated high-frequency signal in the motor 10.

When magnetic saturation is invited in the motor 10, the tentative rotation angle θ1 is not matched with the real rotation angle θ of the rotor 10a. However, in the first embodiment, it is possible to determine, as the fourth effect, the rotation angle θ of the rotor 10a with high accuracy using the relationship between output torque of the motor 10, phase of the drive current vector, and target amplitude of the actually propagated high-frequency signal in the motor 10.

The controller 16 determines that the high-frequency signal (high-frequency voltage) to be superimposed on the α-axis command voltage vαc and β-axis command voltage vβc is located in a direction in which the inductance of the motor 10 is minimum in the d-q coordinate system regardless of the presence or absence of magnetic saturation. This allows, as the fifth effect, the superimposed high-frequency signal to be in agreement with the actually propagated high-frequency signal in phase. Thus, it is possible to correct the difference between the superimposed high-frequency signal to be in agreement with the actually propagated high-frequency signal in phase regardless of the presence or absence of magnetic saturation, thereby determining the rotation angle θ of the rotor 10a with high accuracy using the relationship between output torque of the motor 10, phase of the drive current vector, and target amplitude of the actually propagated high-frequency signal in the motor 10.

When the output torque is equal to or higher than a predetermined threshold value so that it lies within the range of the high output torque, the controller 16 corrects the tentative rotation angle θ1 so as to reduce the difference between the target amplitude and the actual amplitude of the actually propagated high-frequency signal (α- and β-axis current components ihα and ihβ).

In contrast, when the output torque is lower than the predetermined threshold value so that it lies within the range of the low output torque, the controller 16 corrects the tentative rotation angle θ1 using the second correction angle Δθ b for the estimated rotation angle θ1.

This allows, as the sixth effect, high accuracy information associated with the rotation angle of the rotor 10a from the low output torque range to the high output torque range to be obtained.

Determination of whether the output torque is equal to or higher than the predetermined threshold value is executed depending on the estimated output torque Te of the motor 10, which increases, as the seventh effect, the accuracy of the determination.

The controller 16 is configured to:

calculate the tentative rotation angle θ1 such that the outer product between the vector signal of the high-frequency voltage signal vhdc (the α-axis voltage component vhαc and β-axis voltage component vhβc) and the vector signal consisting of the α-axis current component ihα and β-axis current component ihβ becomes zero; and superimpose the high-frequency voltage signal vhdc (the α-axis voltage component vhαc and β-axis voltage component vhβc) on the α-axis command voltage vαc and β-axis command voltage vβc in a direction in which the inductance is estimated to be minimum based on the tentative rotation angle θ1.

This allows, as the eighth effect, the superimposed high-frequency voltage signal vhdc to be oriented in the direction in which the inductance is estimated to be minimum. Especially, calculation of the outer product between the vector signal of the high-frequency voltage signal vhdc and the vector signal consisting of the α- and β-axis current components ihα and ihβ can easily obtain the tentative rotation angle θ1 that allows the difference between the vector signal of the high-frequency voltage signal vhdc and the vector signal consisting of the α-axis current component ihα and β-axis current component ihβ in phase to become zero without executing complicated operations, such as inverse trigonometric functions.

The controller 16 calculates the outer product in the stationary coordinate system (α-β coordinate system). Because the stationary coordinate system (α-β coordinate system) has been fixedly defined in the stator of the motor 10, it is possible to properly calculate, as the ninth effect, the outer product in the stationary coordinate system with high accuracy. Especially, when the high-frequency signal is superimposed on the α-axis voltage component vhαc and β-axis voltage component vhβc in an estimated d-axis in accordance with the tentative rotation angle θ1, conversion of the high-frequency signal in the d-q coordinate system into that in the α-β coordinate system allows the high-frequency signal in the α-β coordinate system to be easily superimposed on the α-axis command voltage vαc and β-axis command voltage vβc.

The controller 16 sets, based on the input value of torque demand data Td from the torque demand input device 17, the d-axis command current idc and q-axis command current iqc except for the values in which the salient characteristic of the motor 10 (rotor 10a) is destroyed. This avoids, as the tenth effect, appearance of the second phenomenon in which the controller 16 is difficult to use the rotation-angle estimating method based on the shift of the inductance in the actually propagated current vector from that in the d-axis.

When the phase of the output-control current vector created by the d-axis command current idc and q-axis command current iqc on the torque maximization curve C1 with respect to the positive direction of the d-axis does not exceed the predetermined threshold angle P, the controller 16 uses the d-axis command current idc and q-axis command current iqc as they are.

In contrast, when the phase of the output-control current vector created by the d-axis command current idc and q-axis command current iqc on the torque maximization curve C1 with respect to the positive direction of the d-axis exceeds the predetermined threshold angle P, the controller 16 uses a current vector inclined toward the negative direction of the d-axis as the d-axis command current idc and q-axis command current iqc.

This allows, as the eleventh effect, the inductance to be changed depending on its direction in the d-q coordinate system, thereby preventing the salient characteristic of the motor 10 (rotor 10a) from being destroyed while using the current vectors defined by the torque maximization curve C1 as much as possible.

The controller 16 superimposes the high-frequency voltage on the α-axis command voltage vαc and β-axis command voltage vβc in a predetermined phase direction in the d-q coordinate system. This can reduce the noise and vibration by the drive of the motor 10 as compared with superimposing the high-frequency voltage thereon in all of the phase directions therein.

Second Embodiment

Figure 11:
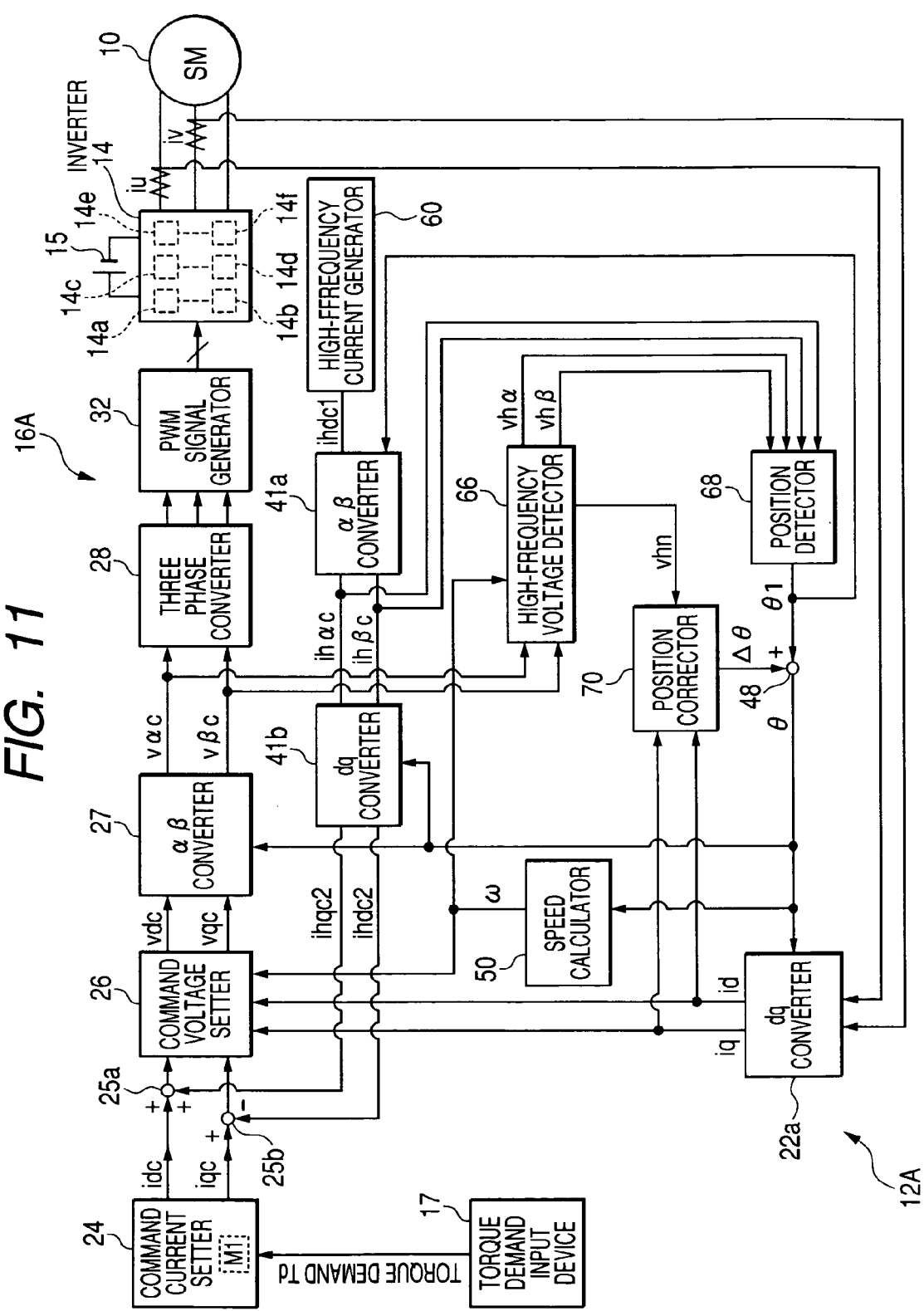
FIG. 11 is a block diagram schematically illustrates an example of the structure of a control system according to a second embodiment of the present invention.

FIG. 11 schematically illustrates an example of the structure of a control system 12A according to a second embodiment of the present invention. Different structural and functional points of the control system 12A from the control system 12 according to the first embodiment will be mainly described hereinafter. Like parts between the control systems 12 and 12A, to which like reference characters are assigned, are omitted or simplified in description.

As illustrated in FIG. 11, a controller 16A of the control system 12A includes a dq converter 22a, the command-current setter 24, fourth and fifth adders 25a and 25b, the command-voltage setter 26, the αβ converter 27, the three-phase converter 28, and the PWM signal generator 32. The controller 16A also includes a high-frequency current generator 60, an αβ converter 41a, a dq converter 41b, a high-frequency voltage detector 66, a position detector 68, a position corrector 70, the third adder 48, and the speed calculator 50.

The high-frequency current generator 60 works to generate a high-frequency current signal ihdc1 in an estimated d-axis as an example of the high-frequency signal therein, and pass it to the αβ converter 41a.

The αβ converter 41a works to convert the high-frequency current signal ihdc1 into an α-axis current component ihαc and a β-axis current component ihβc on the respective α and β-axes of the rotor 10a based on a tentative rotation angle θ1 supplied from the position detector 68.

The dq converter 41b works to convert the α-axis current component ihαc and the β-axis current component ihβc output from the αβ converter 41a into a d-axis current component ihdr2 and a q-axis current component ihqc2 in the d-q coordinate system of the rotor 10a of the motor 10 based on the rotation angle θ of the rotor 10a.

The d-axis current component ihdc2 is supplied to the fourth adder 25a so that the d-axis command current idc is added to the d-axis current component ihdc2 thereby.

The q-axis current component ihqc2 is supplied to the fifth adder 25b so that the q-axis command current iqc is added to the q-axis current component ihqc2 thereby.

The command-voltage setter 26 works to:

determine a d-axis command voltage vdc based on the difference between the measured d-axis current component id and the d-axis command current idc on which the d-axis current component ihdc2 is superimposed; and determine a q-axis command voltage vqc based on the difference between the measured q-axis current component q and the q-axis command current iqc on which the q-axis current component ihqc2 is superimposed.

This allows the d-axis command voltage vdc and q-axis command voltage vqc to work to the current signal ihdc1 on the d-axis command current idc and the q-axis command current iqc in an estimated d-axis.

The dq converter 22a works to convert the instantaneous current components iα and iβ into the d-axis current component id and the q-axis current component iq in the d and q coordinate system based on the rotation angle θ of the rotor 10a without eliminating high-frequency components (high-frequency signal).

This allows a frequency signal, which actually flows in the motor 10 when the d-axis command voltage vdc and q-axis command voltage vqc are determined so as to superimpose the current signal ihdc1 on the d-axis command current idc and the q-ads command current iqc, to be contained in each of the d-axis command voltage vdc and q-axis command voltage vqc.

The d-axis command voltage vdc and the q-axis command voltage vqc are converted by the αβ converter 27 into an α-axis command voltage vαc and a β-axis command voltage vβc on the respective α and β-axes of the rotor 10a based on the rotation angle θ of the rotor 10a.

The high-frequency voltage detector 66 works to extract α- and β-axis voltage components vhα and vhβ on the respective α and β axes from the respective α-axis command voltage vαc and β-axis command voltage vβc as the actually propagated high-frequency signal to the motor 10 corresponding to the actually superimposed high-frequency current signal ihdc1.

The position detector 68 works to:

calculate an outer product between the vector signal consisting of the α-axis voltage component vhα and β-axis voltage component vhβ output from the high-frequency voltage detector 60 and the vector signal of the high-frequency current signal ihdc1 (the α-axis current component ihαc and β-axis current component ihβc); and calculate the tentative rotation angle θ1 so as to make the outer product become zero.

This allows the high-frequency current signal ihdc1 output from the high-frequency current generator 60 to be superimposed on the d-axis command current idc and q-axis command voltage iqc in a direction in which the inductance is minimum, such as the real d-axis direction. The structure and operations of the position detector 68 are substantially identical to those of the position detector 44.

Figure 12:
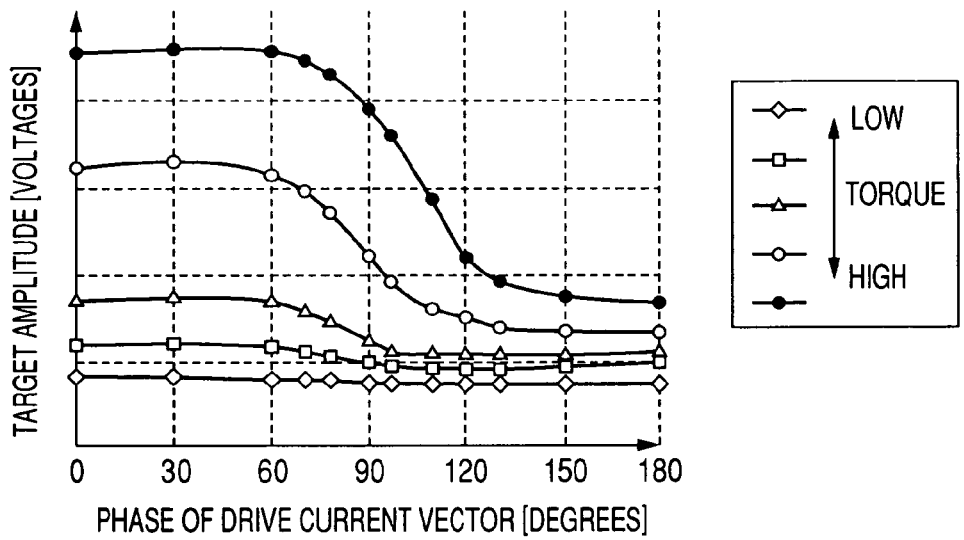
FIG. 12 is a graph schematically illustrating a relationship between output torque of the motor, phase of a drive current vector for output control, and target amplitude of the actually propagated high-frequency signal in the motor according to the second embodiment.

FIG. 12 schematically illustrates a relationship between output torque of the motor 10, phase (phase angle) of a drive current vector for output control consisting of the d-axis current component id and q-axis current component iq, and target amplitude of the actually propagated high-frequency signal (voltage) in the motor 10. More particularly, the relationship illustrated in FIG. 12 has been determined by simulations and/or tests while executing the high-frequency current signal vector superimposing operation in a direction in which the inductance in the motor 10 is minimum.

As illustrated in FIG. 12, the target amplitude of the actually propagated high-frequency voltage in the motor 10 varies with variation of the phase angle of the drive current vector and that of the output torque of the motor 10. For this reason, when a real amplitude of the actually propagated high-frequency voltage is shifted from the target amplitude, it is determined that the controller 16A recognizes a phase angle of the drive current vector deviated from an actually phase angle thereof.

The position corrector 70 has stored therein a map representing the relationship illustrated in FIG. 12 as a data table and/or a program; this relationship has been determined by simulations and/or tests.

The position corrector 70 works to reference the map based on the estimated output torque Te and the calculated phase φ of the drive current vector so as to extract a target amplitude of the actually propagated high-frequency signal (the α- and β-axis voltage components vhα and vhβ) associated with the estimated output torque Te and the calculated phase φ of the drive current vector.

The position corrector 70 also works to:

calculate a first correction angle Δθa for the estimated rotation angle θ1 based on the difference between an actual amplitude vhn of the actually propagated high-frequency signal detected by the high-frequency voltage detector 66 and the target amplitude so as to eliminate the difference in the range of the high output torque of the motor 10;

calculate a second correction angle Δθb for the estimated rotation angle θ1 based on the estimated output torque Te and the calculated phase φ of the drive current vector in the range of the low output torque of the motor 10;

select, based on the estimated output torque Te, the second correction value Δθb in the range of the low output torque of the motor 10 as a definite correction angle Δθ for correcting the tentative rotation angle θ1; and select, based on the estimated output torque Te, the first correction value Δθa in the range of the high output torque of the motor 10 as the definite correction angle Δθ for correcting the tentative rotation angle θ1.

The structure and operations of the position corrector 70 axe substantially identical to those of the position corrector 46.

As described above, the control system 12A according to the second embodiment has substantially the same first to twelfth effects as the control system 12 according to the first embodiment.

Third Embodiment

A control system according to a third embodiment of the present invention will be described hereinafter. Like parts between the control system 12 according to the first embodiment and the control system according to the third embodiment, to which like reference characters are assigned, are omitted or simplified in description.

Figure 13:
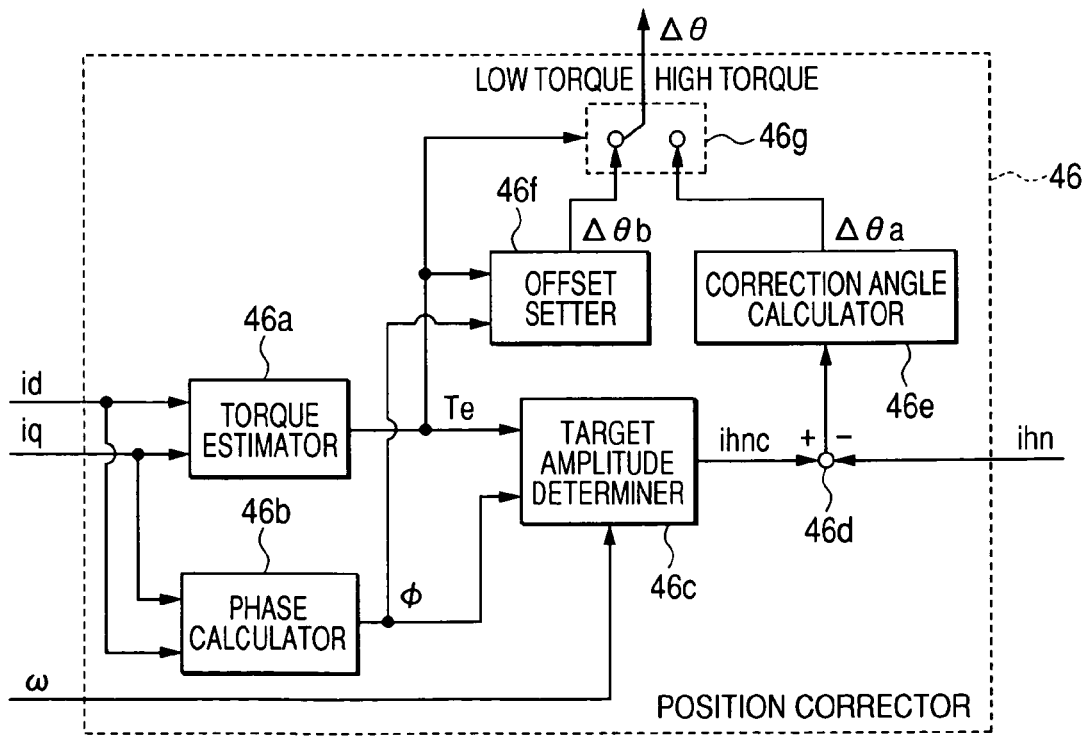
FIG. 13 is a block diagram schematically illustrating an example of the structure of a position corrector according to a third embodiment of the present invention.

In the control system according to the third embodiment, as illustrated in FIG. 13, the target amplitude determiner 46c works to determine the amplitude of the actually propagated high-frequency signal (the α- and β-axis current components ihα and ihβ) associated with the estimated output torque Te, the calculated phase φ of the drive current vector, and the rotation speed ω of the motor 10 (see step S14 of FIG. 9). Specifically, the amplitude of the actually propagated high frequency signal (α- and β-axis current components ihα and ihβ) is changed with change in the RPM of the motor 10.

The control system according to the third embodiment, in addition to the first to twelfth effects, more improve the accuracy of determination of the target amplitude of the actually propagated high-frequency signal (α- and β-axis current components ihα and ihβ).

Fourth Embodiment

Figure 14:
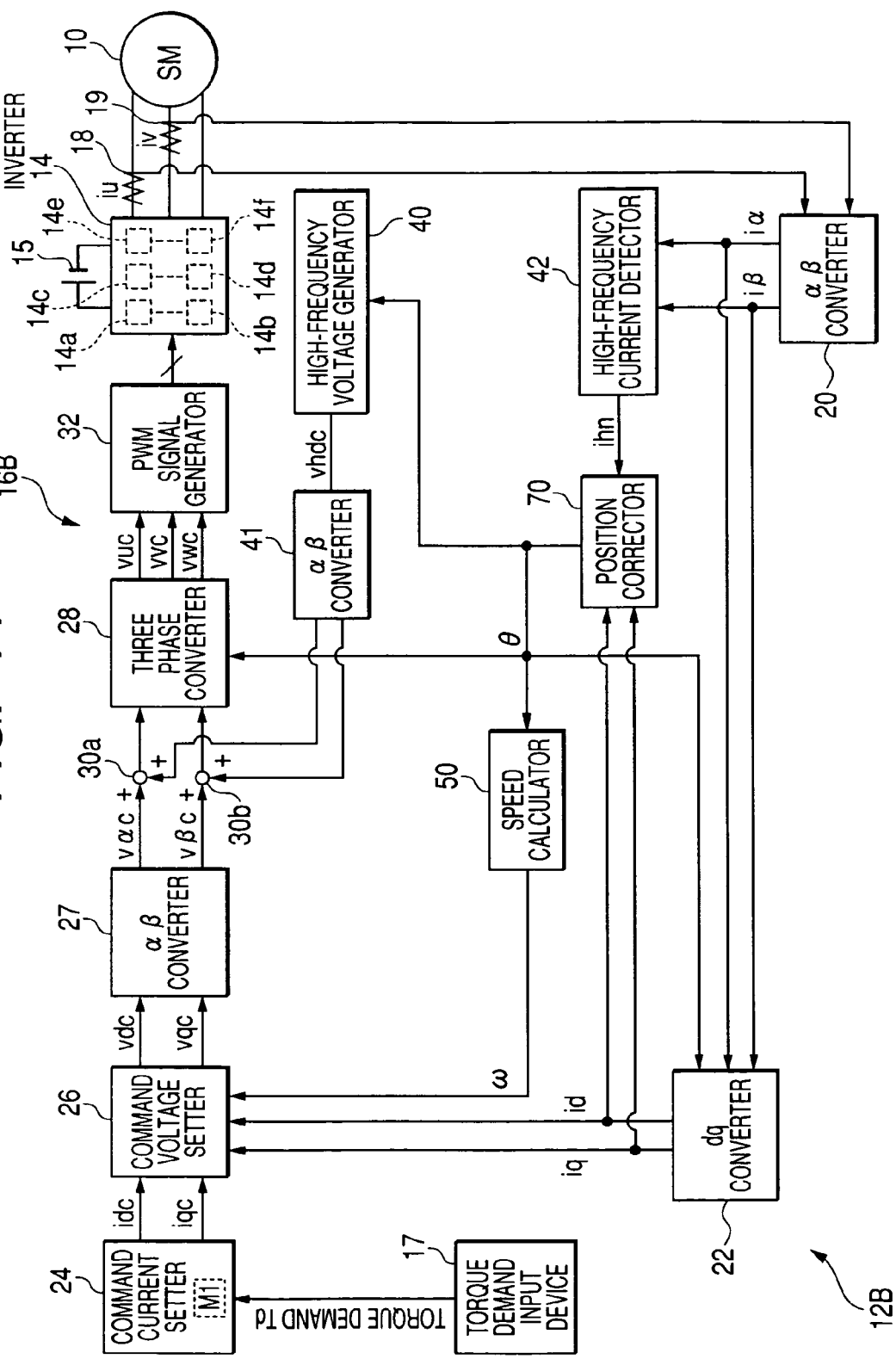
FIG. 14 is a block diagram schematically illustrates an example of the structure of a control system according to a fourth embodiment of the present invention.

FIG. 14 schematically illustrates an example of the structure of a control system 12B according to a fourth embodiment of the present invention. Different structural and functional points of the control system 12B from the control system 12 according to the first embodiment will be mainly described hereinafter. Like parts between the control systems 12 and 12B, to which like reference characters are assigned, are omitted or simplified in description.

The control system 12B according to the fourth embodiment has no functions of calculating the tentative rotation angle θ1 using the outer product between the vector signal of the high-frequency voltage signal vhdc and the vector signal consisting of the α-axis current component ihα and β-axis current component ihβ.

Specifically, in place of the position detector 44 and the position corrector 46, the controller 16B of the control system 12B is equipped with a position determiner 70 for directly determining the rotation angle θ.

Figure 15:
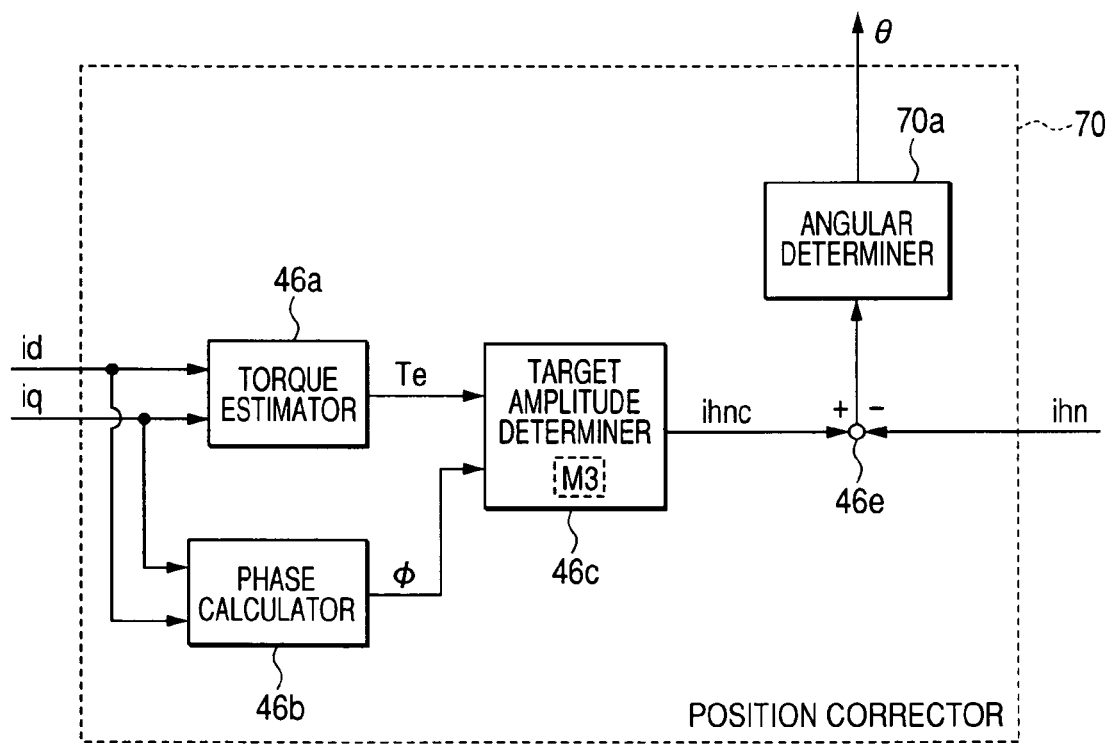
FIG. 15 is a block diagram schematically illustrating an example of the structure of a position corrector according to the fourth embodiment of the present invention.

FIG. 15 schematically illustrates an example of the structure of the position determiner 70 according to the fourth embodiment. Like parts between the position corrector 46 and position determiner 70, to which like reference characters are assigned, are omitted or simplified in description.

The position determiner 70 includes, in addition to the torque estimator 46a, the phase calculator 46b, the target amplitude determiner 46c, and the difference calculator 46d, an angular determiner 70a.

The angular determiner 70a works to determine the rotation angle θ of the rotor 10a so as to eliminate the difference between the actual amplitude ihn of the actually propagated high-frequency signal (α- and β-axis current components ihα and ihβ) passed from the high-frequency detector 42 and the target amplitude ihnc thereof calculated by the difference calculator 46d.

In the fourth embodiment, a high-frequency voltage generator 40A works to generate the high-frequency voltage signal vhdc in an estimated d-axis based on the rotation angle θ of the rotor 10a.

Specifically, in the fourth embodiment, the αβ converter 41 works to convert the high-frequency voltage signal vhdc into an α-axis voltage component vhαc and a β-axis voltage component vhβc on the respective α and β-axes of the rotor 10a, and output the converted α-axis voltage component vhαc and β-axis voltage component uhβc to the first and second adders 30a and 30b, respectively.

This allows the high-frequency voltage signal vhdc output from the high-frequency voltage generator 40A to be superimposed on the α-axis command voltage vαc and β-axis command voltage vβc in the estimated d-axis direction that does not necessarily coincide with a direction in which the inductance is minimum.

Therefore, target amplitude determiner 46c has stored therein a map M3 representing the relationship between output torque of the motor 10, phase (phase angle) of the drive current vector for output control consisting of the d-axis current component id and q-axis current is component iq, and target amplitude of the actually propagated high-frequency signal (current) in the motor 10. The relationship has been determined by simulations and/or tests while superimposing the high-frequency signal (voltage) on the α-axis command voltage vαc and β-axis command voltage vβc in the estimated d-axis.

Specifically, the target amplitude determiner 46c works to reference the map M3 based on the estimated output torque Te and the calculated phase φ of the drive current vector so as to extract a target amplitude ihnc of the actually propagated high-frequency signal (the α- and β-axis current components ihα and ihβ) associated with the estimated output torque Te and the calculated phase φ of the drive current vector.

The remaining operations of the control system 12B are substantially identical to those of the first embodiment.

As described above, the control system 12B according to the fourth embodiment provides the first to third effects, and the twelfth effect.

Fifth Embodiment

Figure 16:
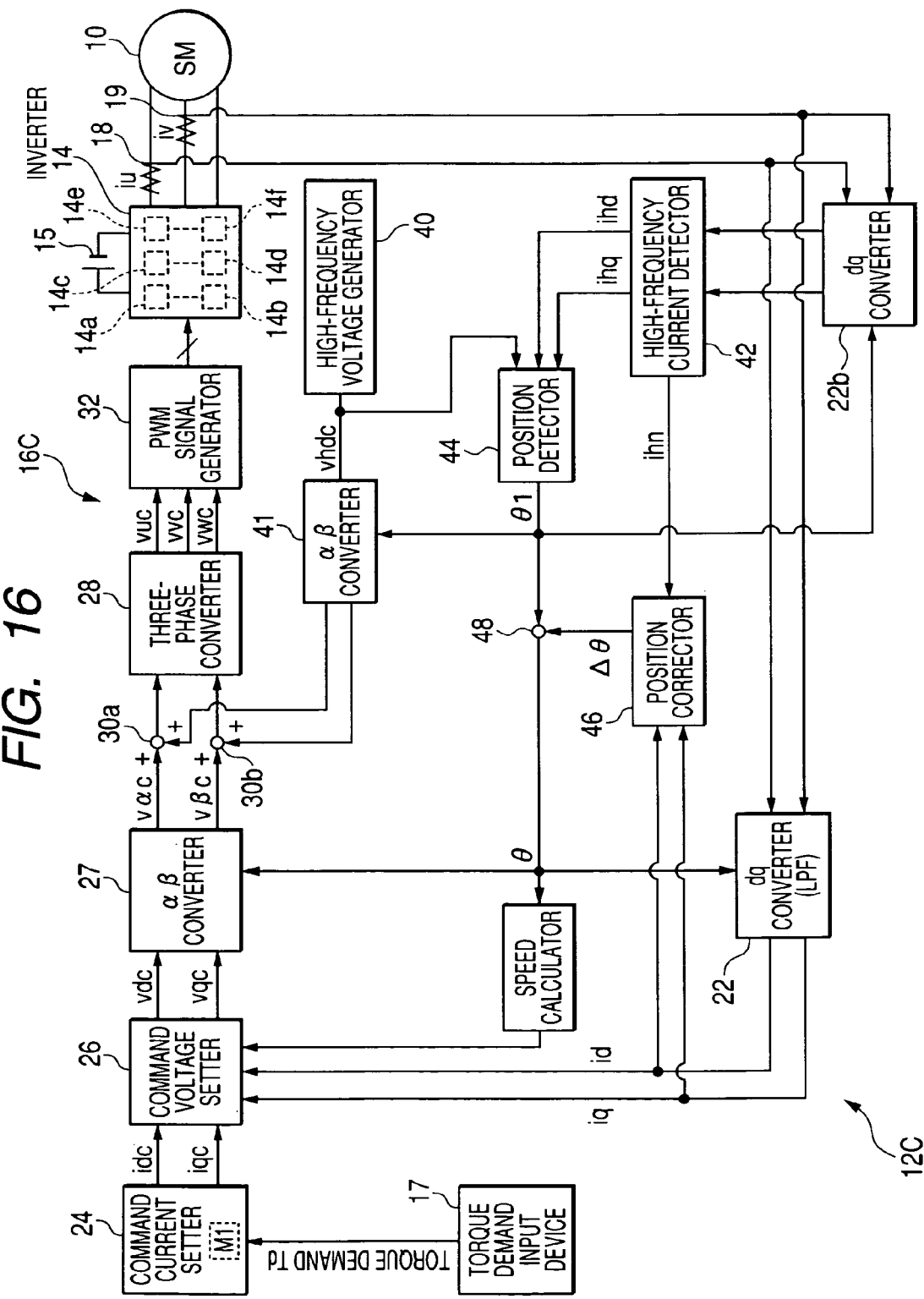
FIG. 16 is a block diagram schematically illustrates an example of the structure of a control system according to a fifth embodiment of the present invention.

FIG. 16 schematically illustrates an example of the structure of a control system 12C according to a fifth embodiment of the present invention. Different structural and functional points of the control system 12C from the control system 12 according to the first embodiment will be mainly described hereinafter. Like parts between the control systems 12 and 12C, to which like reference characters are assigned, are omitted or simplified in description.

A controller 12C of the control system 12 includes a dq converter 22b in place of the αβ converter 20.

The dq converter 22b works to convert the instantaneous U- and V-phase alternating currents iu and iv respectively detected by the first and second current sensors 18 and 19 into a d-axis current component id and a q-axis current component iq in the d-q coordinate system based on the tentative rotation angle θ1 of the rotor 10a.

A high-frequency current detector 42A works to extract a high-frequency current component from each of the instantaneous current components id and id. Specifically, d- and q-axis current components ihd and ihq on the d and q awes are generated by the high-frequency current detector 42A as the actually propagated high-frequency signal to the motor 10 corresponding to the actually superimposed high-frequency voltage signal vhdc.

A position detector 44A works to calculate an outer product, on the d and q axes, between the vector signal of the high-frequency voltage signal vhdc and the vector signal consisting of the d-axis current component ihd and q-axis current component ihq. The outer product serves as a parameter having a correlation with a difference in phase between the high-frequency voltage signal vhdc and each of the d-axis current component ihd and q-axis current component ihq.

The remaining operations of the control system 12C are substantially identical to those of the first embodiment.

As described above, in the control system 12C according to the fifth embodiment, it is possible for the position detector 44A to calculate the outer product, on the d and q axes, between the vector signal of the high-frequency voltage signal vhdc and the vector signal consisting of the d-axis current component ihd and q-axis current component ihq. This allows, the fourteenth effect in addition to the first to eighth effects, and the tenth to twelfth effects, the tentative rotation angle θ1 to be determined by the position detector 44A.

Sixth Embodiment

A control system according to a sixth embodiment of the present invention will be described hereinafter Like parts between the control system 12 according to the first embodiment and the control system according to the sixth embodiment, to which like reference characters are assigned, are omitted or simplified in description.

Figure 17:
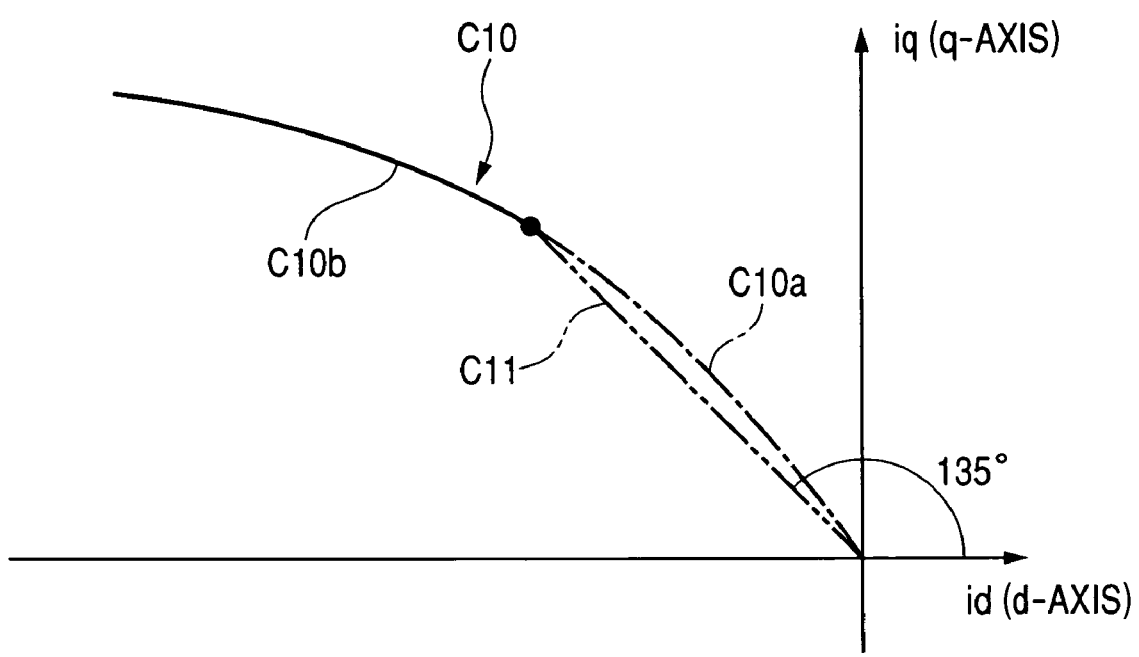
FIG. 17 is a view schematically illustrating a toque maximization curve in the d-q coordinate system according to a sixth embodiment of the present invention.

FIG. 17 schematically illustrates how to determine the d-axis command current idc and q-axis command current iqc according to the sixth embodiment of the present invention.

As illustrated in FIG. 17 corresponding to FIG. 6 according to the first embodiment, a toque maximization curve C10 represented by the map M1 of the command-current setter 24 in the d-q coordinate system smoothly extending from a dashed line C10a to a solid line C10b represents maximum torque of the motor 10 as a function of d-axis command current and q-axis command current with minimum power consumption being kept.

In other words, determination of a value of the d-axis command current and that of the q-axis command current corresponding thereto on the torque maximization curve C10 as the d-axis command current idc and q-axis command current iqc allows the maximum torque of the motor 10 to be obtained with minimum power consumption being kept.

In the sixth embodiment, a part C10a of the torque maximization curve C10, which is close to the q-axis and illustrated by the dashed line, is corrected to a straight line C11 illustrated by a chain double-dashed line. A current vector determined by a point on the curve C11 is biased toward the negative direction of the d-axis as compared with a current vector determined by a point on the part C10a of the torque maximization curve C10.

Specifically, in the sixth embodiment, a phase (phase angle) of the output-control current vector depending on the input value of the torque demand data rd with respect to the positive direction of the d-axis may be smaller than a predetermined threshold angle P of, for example, 135 degrees.

In this case, the command-current setter 24 is configured to set a corrected output-current control vector consisting of values of d- and q-axis command currents idc and iqc on the straight line C11. This can prevent the second phenomenon illustrated in FIG. 5C from occurring.

In addition, the phase of the output-control current vector depending on the input value of the torque demand data Td with respect to the positive direction of the d-axis may be equal to or greater than the predetermined threshold angle P of 135 degrees.

As seen in the illustration of FIG. 7B, when the output-control current vector is determined such that its phase with respect to the positive direction of the d-axis is set to 90 degrees lower than the predetermined threshold angle P of 135 degrees, the actually propagated current vector in the d-q coordinate system is substantially unbiased.

At that time, as seen in the illustration of FIG. 7C, the output-control current vector is changed such that its phase with respect to the positive direction of the d-axis is set to 135 degrees higher than the predetermined threshold angle P while the magnitude of the output-control current vector is kept unchanged. This allows the actually propagated current vector in the d-q coordinate system to be biased.

In addition, as illustrated in FIG. 7C, the locus of the actually propagated current vector in the d-q coordinate system under the phase of the output-control current vector with respect to the positive direction of the d-axis is set to 135 degrees provides a direction in which current most likely flows is located along the real d-axis.

Thus, when the phase of the output-control current vector with respect to the positive direction of the d-axis is equal to or greater than 135 degrees, it is possible to establish the direction of the real d-axis as a direction in which current most likely flows, in other words, the inductance is minimum.

Accordingly, when the phase of the output-control current vector with respect to the positive direction of the d-axis is equal to or greater than 135 degrees, it is possible to match the tentative rotation angle θ1 with the actual rotation angle of the rotor 10a without correcting the tentative rotation angle θ1 so as to reduce the difference between the target amplitude and the actual amplitude of the actually propagated high-frequency signal (current) in the motor 10.

Seventh Embodiment

Figure 18:
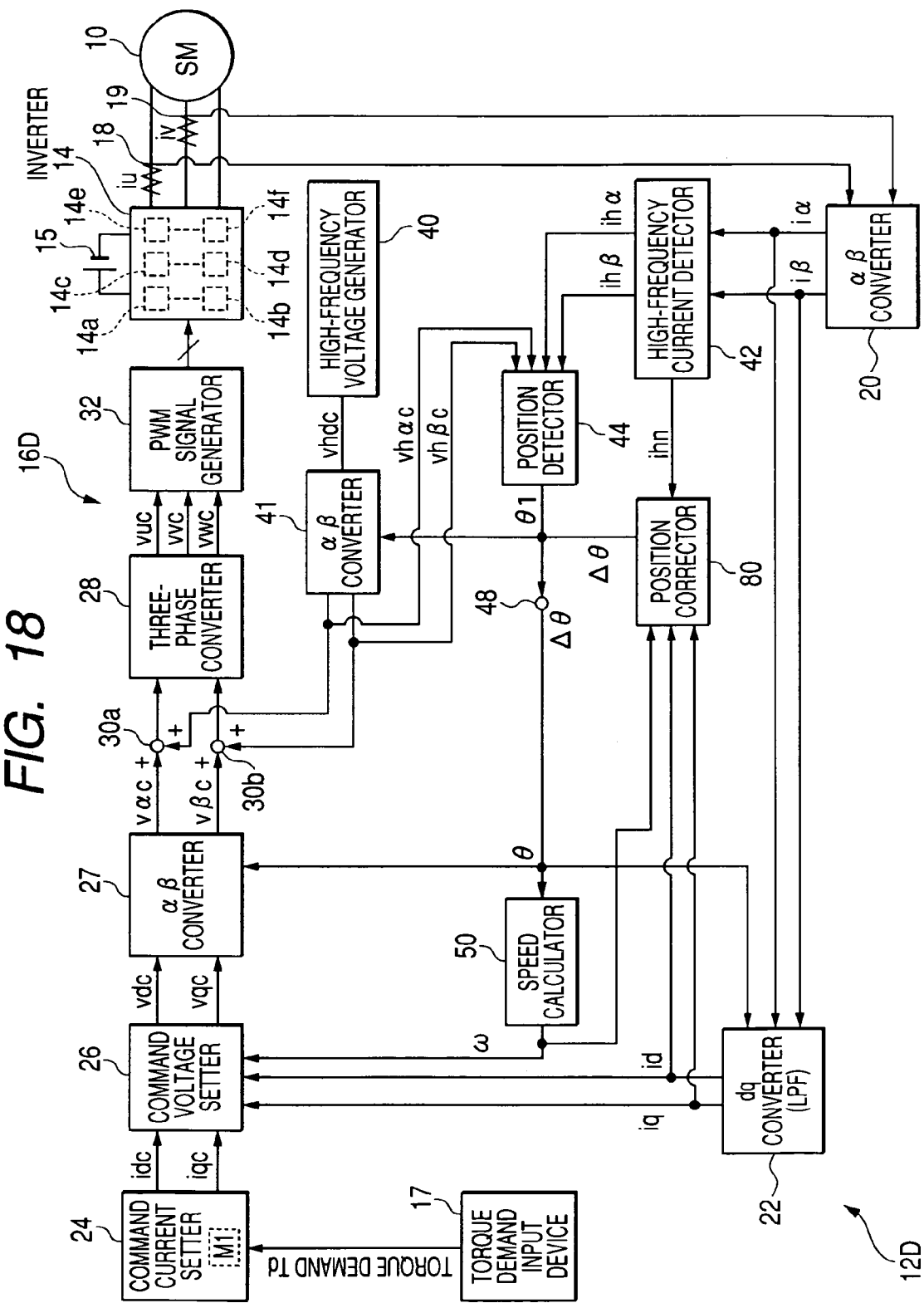
FIG. 18 is a block diagram schematically illustrating an example of the structure of a position corrector according to a seventh embodiment of the present invention.

FIG. 18 schematically illustrates an example of the structure of a control system 12D according to a seventh embodiment of the present invention. Different structural and functional points of the control system 12D from the control system 12 according to the first embodiment will be mainly described hereinafter Like parts between the control systems 12 and 12D, to which like reference characters are assigned, are omitted or simplified in description.

The control system 121) according to the seventh embodiment consists of a position detector 80 whose structure is different from the position detector 46 according to the first embodiment.

Like the first embodiment, a controller 16D of the control system 121) according to the seventh embodiment is configured to address appearance of the first phenomenon set forth above.

Figure 19:
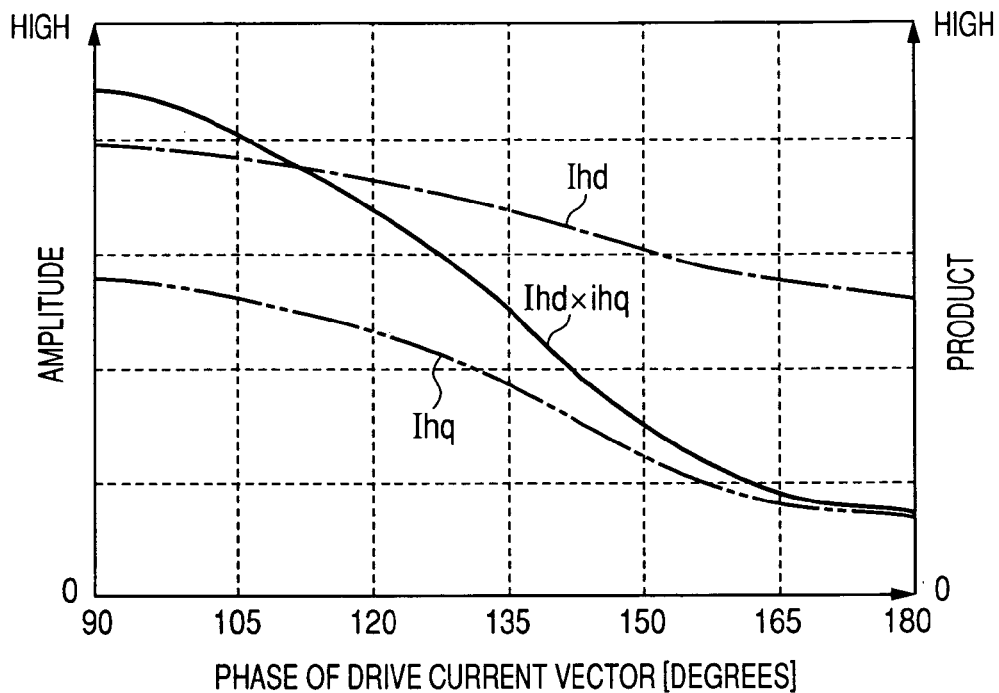
FIG. 19 is a graph schematically illustrating a relationship between:
phase of a drive current vector for output control;
first amplitude of a first actually propagated high-frequency signal in the motor when a first high-frequency signal is superimposed on the d-axis;
second amplitude of a second actually propagated high-frequency signal in the motor when a second high-frequency signal is superimposed on the q-axis; and
product of the first amplitude and the second amplitude.

FIG. 19 schematically illustrates a relationship between:

phase (phase angle) of a drive current vector for output control consisting of the d-axis current component id and q-axis current component iq;

first amplitude Ihd of a first actually propagated high-frequency signal (current) in the motor 10 when a first high-frequency signal (voltage) is superimposed on the d-axis;

second amplitude Ihq of a second actually propagated high-frequency signal (current) in the motor 10 when a second high-frequency signal (voltage) is superimposed on the q-axis; and product "Ihd×Ihq" of the first amplitude and the second amplitude.

Specifically, the dashed line represents the first amplitude Ihd of the first actually propagated high-frequency signal (current) in the motor 10 when the first high-frequency signal (voltage) is superimposed on the d-axis. The chain double-dashed line represents second amplitude Ihq of the actually propagated high-frequency signal (current) in the motor 10 when the second high-frequency signal (voltage) is superimposed on the q-axis. The solid line represents the products "Ihd×Ihq" of the first amplitude Ihd and the second amplitude Ihq.

Note that, in the seventh embodiment, the first and second amplitudes of the first and second high-frequency signals superimposed in the d-axis and q-axis are represented as the lengths of the high-frequency signal vector on the respective $\alpha$ and $\beta$ axes. The first and second amplitudes of the first and second high-frequency signals can be represented as the lengths of the high-frequency signal vector on the respective d and q axes, or can be represented as amplitudes of high-frequency signals on the U-, V-, and W-phase windings, As illustrated in FIG. 19, the first amplitude of the first high-frequency signal in the d-axis and the second amplitude of the second high-frequency signal in the q-axis are changed with change in the phase of the drive current vector.

For this reason, when, for example, a first actual amplitude of a first actually propagated high-frequency signal in the d-axis is deviated from the locus of the first amplitude Ihd, the phase of the drive current vector is probably deviated from an actual phase of the rotor 10a. In other words, the controller 16D recognizes, as the actual rotation angle of the rotor 10a, another rotation angle (precisely, electric angle) deviated therefrom. Much the same is true on when a second actual amplitude of a second actually propagated high-frequency signal in the q-axis is deviated from the locus of the second amplitude Ihq.

For this reason, the controller 16D can be configured to correct the tentative rotation angle $\theta 1$ so as to reduce a difference between the first actual amplitude of the first actually propagated high-frequency signal and the first amplitude Ihd illustrated in FIG. 19 and/or a difference between the second actual amplitude of the second actually propagated high-frequency signal and the second amplitude Ihq illustrated in FIG. 19. This allows the corrected rotation angle $\theta$ of the rotor 10a to precisely follow the actual electric angle thereof.

Especially, as illustrated in FIG. 19, the product "Ihd×Ihq" of the first amplitude Ihd and the second amplitude Ihq changes more significantly depending on change in the phase of the drive current vector as compared with each of the first amplitude IM and the second amplitude Ihq.

For this reason, in the seventh embodiment, the controller 16 is configured to correct the tentative rotation angle $\theta 1$ so as to reduce a difference between the product "Ihd×Ihq" and the product of the first actual amplitude of the first actually propagated high-frequency signal and the second actual amplitude of the second actually propagated high-frequency signal. This makes it possible to precisely detect the difference between the tentative rotation angle of the rotor 10a and the actual rotation angle thereof.

Specifically, in the seventh embodiment, the controller 16D is configured to:

superimpose the first high-frequency signal in the d-axis direction on the $\alpha$-axis command voltage v$\alpha$c, superimpose the second high-frequency signal in the q-axis direction on the $\beta$-axis command voltage v$\beta$c; and correct the tentative rotation angle $\theta 1$ so as to eliminate the difference between the product "Ihd×Ihq", referred to as "target product", and the product of the first actual amplitude of the first actually propagated high-frequency signal and the second actual amplitude of the second actually propagated high-frequency signal.

Specifically, a high-frequency voltage generator 40B works to:

generate the first high-frequency voltage signal vhdc in the d-axis as an example of the high-frequency signal therein at a first timing;

pass the first high-frequency voltage signal vhdc to the $\alpha\beta$ converter 41;

generate the second high-frequency voltage signal vhqc in the q-axis as an example of the high-frequency signal therein at a second timing different from the first timing; and pass the second high-frequency voltage signal vhqc to the $\alpha\beta$ converter 41.

In addition, in the seventh embodiment, the controller 16D is equipped with a position corrector 80 for correcting the tentative rotation angle $\theta 1$ so as to reduce a difference between the actual product of the first actually propagated high-frequency signal and the second actually propagated high-frequency signal.

Figure 20:
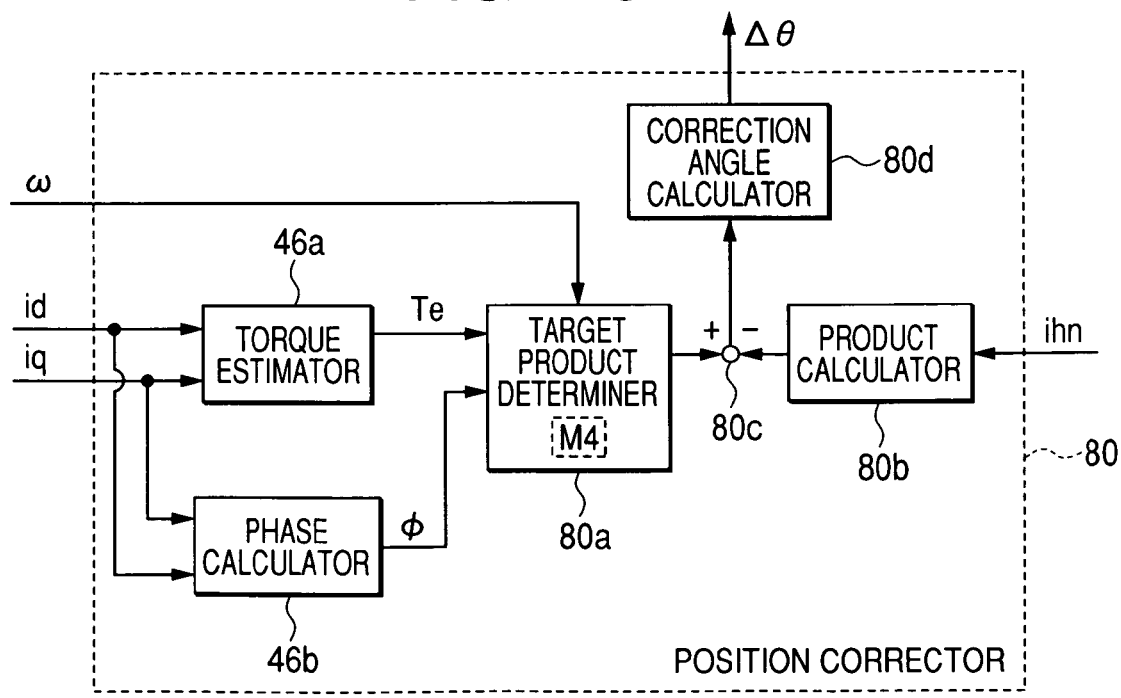
FIG. 20 is a block diagram schematically illustrating an example of the structure of a position corrector according to the seventh embodiment.

FIG. 20 schematically illustrates an example of the structure of the position corrector 80 according to the seventh embodiment.

The position corrector 80 consists of the torque estimator 46a, the phase calculator 46b, a target product determiner 80a, a product calculator 80b, a difference calculator 80c, and a correction angle calculator 80d.

The torque estimator 46a works to calculate an estimated output torque Te of the motor 10 based on the d-Xs current component id and q-axis current component iq.

The phase calculator 46b works to calculate the phase (phase angle) $\phi$ of the drive current vector flowing in the motor 10 and consisting of the d-axis current component id and q-axis current component iq with respect to the positive direction of the d-axis.

The target product determiner 80a has stored therein a map M4 representing the relationship illustrated in FIG. 19 as a data table and/or a program. The target product determiner 80a works to reference the map M4 based on the estimated output torque Te, the calculated phase $\phi$ of the drive current vector, and the rotation speed $\omega$ so as to extract a target product of the first and second amplitudes Ihd and Ihq of the first and second actually propagated high-frequency signals (the $\alpha$- and $\beta$-axis current components ih$\alpha$ and ih$\beta$) associated with the estimated output torque Te, the calculated phase $\phi$ of the drive current vector, and the actual rotation speed $\omega$ of the motor 10.

Specifically, because the target product depends on the output torque of the motor 10 and the rotation speed $\omega$ thereof in addition to the phase $\phi$ of the drive current vector, the target product determiner 80a works to determine the target product based on the three parameters of the estimated output torque Te, the calculated phase d of the drive current vector, and the rotation speed $\omega$ of the motor 10.

The product calculator 80b works to;

calculate an actual product of the first actual amplitude ihn of the first actually propagated high-frequency signal ihd ($\alpha$- and $\beta$-axis current components ih$\alpha$ and ih$\beta$) extracted when the first high-frequency voltage signal vhdc in the d-axis is output from the high-frequency voltage generator 40B and the second actual amplitude it of the second actually propagated high-frequency signal ihq ($\alpha$- and $\beta$-axis current components ih$\alpha$ and ih$\beta$) extracted when the second high-frequency voltage signal vhqc in the q-axis is output from the high-frequency voltage generator 40B.

The difference calculator 80c works to calculate the difference between the actual product calculated by the product calculator 80b and the target product determined by the target product determiner 80a.

The correction angle calculator 80d works to calculate a correction angle $\Delta\theta$ for the estimated rotation angle $\theta 1$ based on the difference calculated by the difference calculator 80c so as to make the actual product follow the target product. For example, the correction angle calculator 80d works to:

calculate a proportional term and an integral term based on the calculated difference between the actual product and the target product, and calculate the correction angle $\Delta\theta$ for the estimated rotation angle $\theta 1$ based on the sum of the proportional term and the integral term.

Figure 21:
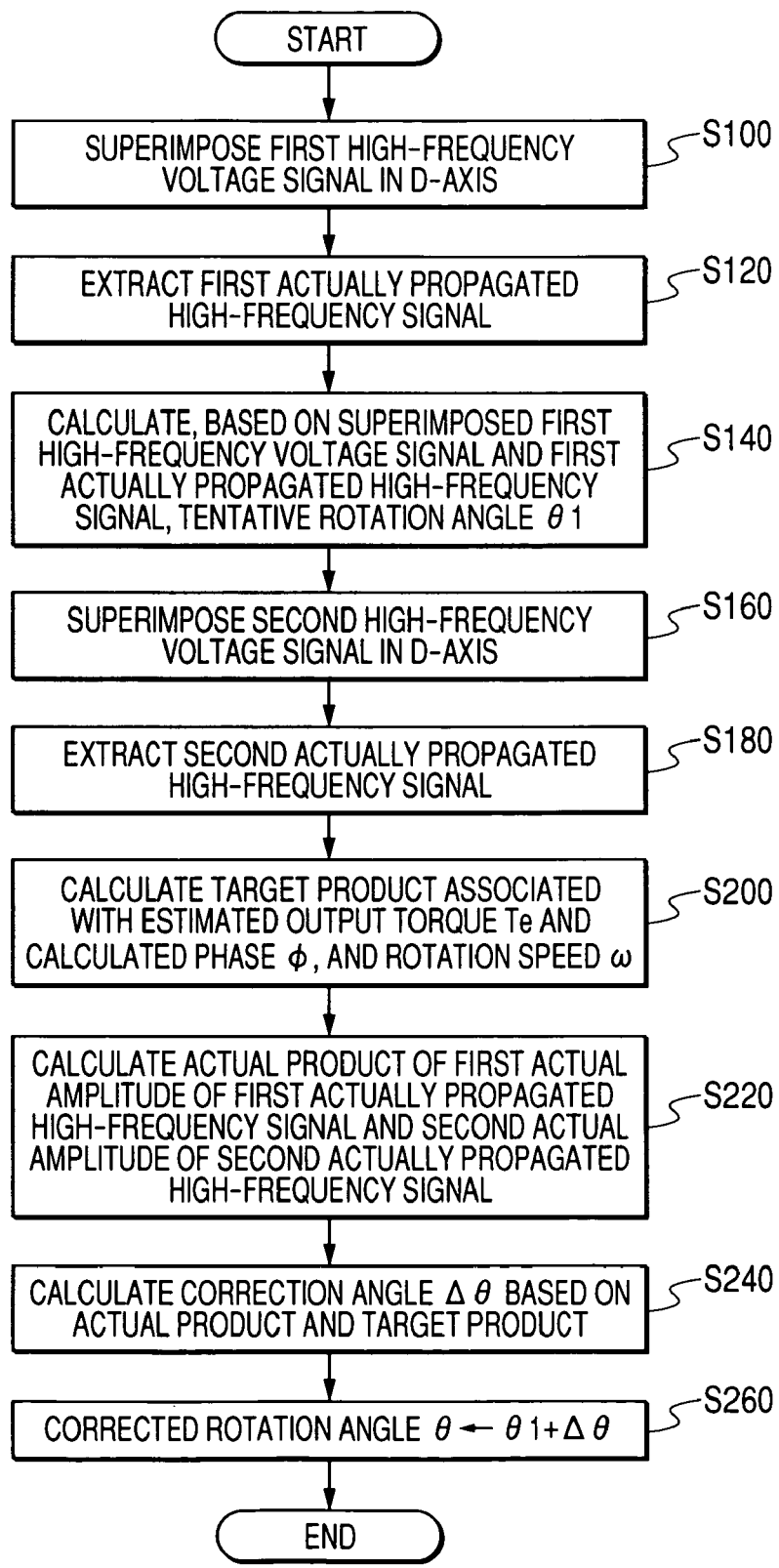
FIG. 21 is a flowchart schematically illustrating a rotation angle determining task to be executed by a controller illustrated in FIG. 18.

FIG. 21 schematically illustrates a rotation angle determining task set forth above to be executed by the controller 16D, especially, its microcomputer, in accordance with at least one program stored in a memory of the microcomputer. The rotation angle determining task is repeatedly executed by the microcomputer of the controller 16D at predetermined regular intervals.

When launching the program, the microcomputer of the controller 16D superimposes the first high-frequency voltage signal vhdc in the d-axis direction on the $\alpha$-axis command voltage v ac in step S100. Next, in step S120, the microcomputer of the controller 16D extracts the first actually propagated high-frequency signal ihd (high-frequency current components ih$\alpha$ and ih$\beta$) from the respective instantaneous current components i$\alpha$ and i$\beta$.

In step S140, the microcomputer of the controller 16D calculates based on the superimposed first high-frequency voltage signal vhdc (t-axis voltage component vh$\alpha$c and $\beta$-axis voltage component vh$\beta$c) and the first actually propagated high-frequency signal ihd ($\alpha$-axis current component ih$\alpha$ and $\beta$-axis current component ih$\beta$), the tentative rotation angle $\theta 1$ in step S140.

Next, the microcomputer of the controller 16D superimposes the second high-frequency voltage signal vhqc in the q-axis direction on the $\beta$-axis command voltage v$\beta$c in step S160. Next, in step S180, the microcomputer of the controller 16D extracts the second actually propagated high-frequency signal ihq (high-frequency current components ih$\alpha$ and ih$\beta$) from the respective instantaneous current components i$\alpha$ and i$\beta$.

In step S200, the microcomputer of the controller 16D references the map M4 based on the estimated output torque Te, the calculated phase $\phi$ of the drive current vector, and the rotation speed $\omega$ so as to extract the target product of the first and second amplitudes Ihd and Ihq of the first and second actually propagated high-frequency signals (the $\alpha$- and $\beta$-axis current components ih$\alpha$ and ih$\beta$) associated with the estimated output torque Te, the calculated phase d of the drive current vector, and the actual rotation speed $\omega$ of the motor 10.

In step S220, the microcomputer of the controller 16D calculates the actual product of the first actual amplitude ihn of the first actually propagated high-frequency signal ihd ($\alpha$- and $\beta$-axis current components ih$\alpha$ and ih$\beta$) extracted in step S120 and the actual amplitude ihn of the second actually propagated high-frequency signal ihq ($\alpha$- and $\beta$-axis current components ih$\alpha$ and ih$\beta$) extracted in step S180.

Specifically, in step S220, the microcomputer of the controller 16D calculates the first maximum length of the vector signal consisting of the high-frequency current components ih$\alpha$ and ih$\beta$ extracted in step S120 as the first actual amplitude ihn of the first actually propagated high-frequency signal ihd. Similarly, the microcomputer of the controller 16D calculates the second maximum length of the vector signal consisting of the high-frequency current components ih$\alpha$ and ih$\beta$ extracted in step S180 as the second actual amplitude ihn of the second actually propagated high-frequency signal ihq.

Then, in step S220, the microcomputer of the controller 16D calculates the product of the first maximum length and the second maximum length as the actual product.

Next, in step S240, the microcomputer of the controller 16D calculates the correction angle $\Delta\theta$ for the estimated rotation angle $\theta 1$ based on the difference between the target product calculated in step S220 and the actual product calculated in step S220.

Thereafter, in step S260, the microcomputer of the controller 16D calculates the sum of the tentative rotation angle $\theta 1$ and the calculated correction angle $\Delta\theta$ as the rotation angle $\theta$.

The rotation angle determining task allows the rotation angle $\theta$ to be determined with high accuracy even if magnetic saturation is invited in the motor 10.

Specifically, as illustrated in FIG. 10, occurrence of magnetic saturation causes the inductance minimum direction to be deviated from the real d-axis, so the direction in which the tentative rotation angle $\theta 1$ becomes zero is shifted from the real d-axis.

However, in the seventh embodiment, correction of the tentative rotation angle $\theta 1$ by the correction angle $\Delta\theta$ allows the inductance minimum direction to be matched with the real d-axis.

As described above, the control system 12D according to the seventh embodiment provides the following fifteenth to nineteenth effects as follows.

Specifically, the controller 16D corrects the tentative rotation angle $\theta 1$ so as to reduce the difference between the target product of the first and second amplitudes Ihd and Ihq of the first and second actually propagated high-frequency signals obtained based on the map M4 and the actual product of the first actual amplitude ihn of the first actually propagated high-frequency signal ihd ($\alpha$- and $\beta$-axis current components ih$\alpha$ and ih$\beta$) and the actual amplitude ihn of the second actually propagated high-frequency signal ihq ($\alpha$- and $\beta$-axis current components ih$\alpha$ and ih$\beta$). This enables, as the fifteenth effect, the rotation angle $\theta$ to be determined with high accuracy even if magnetic saturation is invited in the motor 10.

Especially, the target product of the first and second amplitudes Ihd and Ihq of the first and second actually propagated high-frequency signals is widely changed depending on change in the phase of the drive current vector for the motor 10. This increases the change of the difference between the target product and the actual product in response to the difference between the tentative rotation angle $\theta 1$ of the rotor 10a and the actual rotation angle $\theta$, making it possible to precisely correct the tentative rotation angle $\theta 1$ of the rotor 10a.

The controller 16D superimpose the first high-frequency voltage signal vhdc (the $\alpha$-axis voltage component vh$\alpha$c and $\beta$-axis voltage component vh$\beta$c) on the $\alpha$-axis command voltage v$\alpha$c and $\beta$-axis command voltage v$\beta$c based on the tentative rotation angle $\theta 1$. This allows the first high-frequency voltage signal vhdc to be in agreement with the first actually propagated high-frequency signal in phase. It is therefore possible to prevent, as the sixteenth effect, the calculated rotation angle $\theta$ of the rotor 10a from being corrected by the position detector 44 although the calculated rotation angle $\theta$ properly follows the actually rotation angle thereof.

The controller 16D is configured to correct the tentative rotation angle $\theta 1$ so as to zero the difference between the target product and the actual product, making it possible to, as the seventeenth effect, calculate the rotation angle θ of the rotor 10a with high accuracy.

The controller 16D is configured to determine the target product based on the estimated torque Te of the motor 10. This can reflect, as the eighteenth effect, the change in the estimated torque Te of the motor 10 on the target product that depends on the change in the estimated torque Te.

The controller 16D is configured to determine the target product based on the phase of the drive current vector and the rotation speed ω of the motor 10, making it possible to, as the nineteenth effect, increase the accuracy of determination of the target product.

Eighth Embodiment

A control system according to an eighth embodiment of the present invention will be described hereinafter. Like parts between the control system 12 according to the seventh embodiment and the control system according to the eighth embodiment, to which like reference characters are assigned, are omitted or simplified in description.

Figure 22:
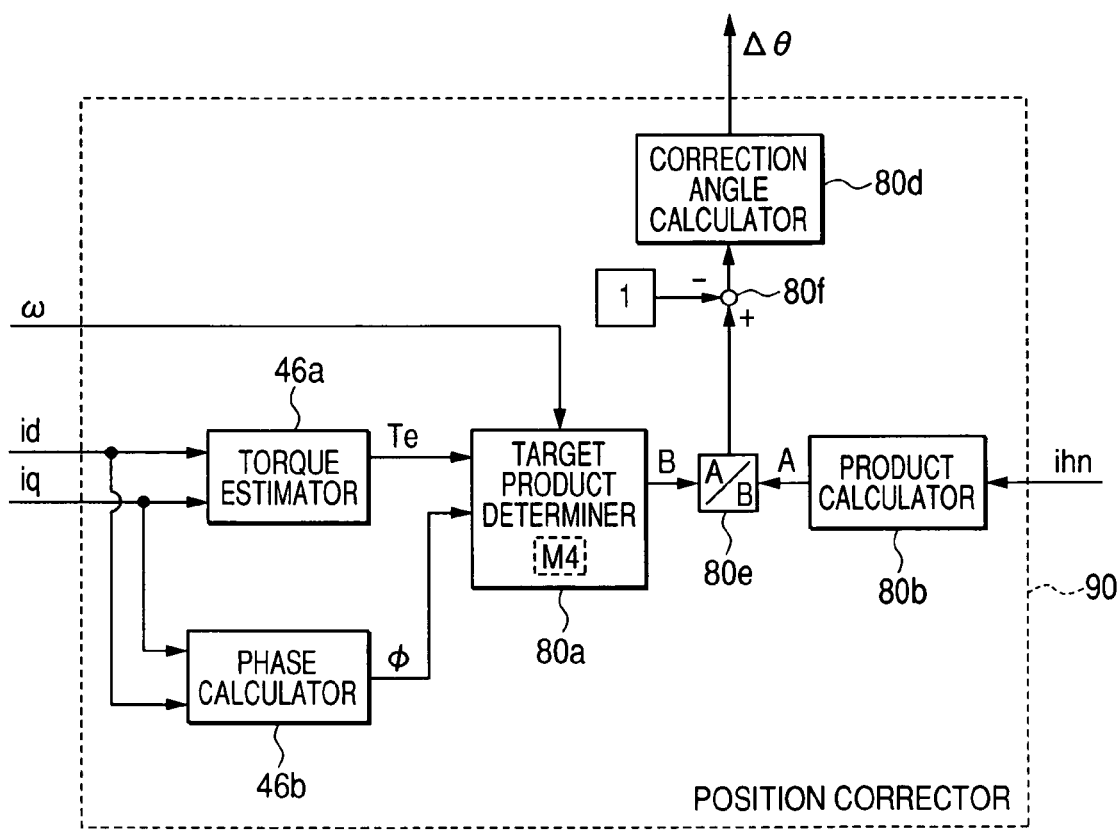
FIG. 22 is a block diagram schematically illustrating an example of the structure of a position corrector according to an eighth embodiment of the present invention.

In the control system according to the eighth embodiment, as illustrated in FIG. 22, a position corrector 90 according to the eighth embodiment is composed of a divider 80e and a deviation calculator 80f.

The divider 80e works to divide the actual product, referred to as "A" in FIG. 22, calculated by the product calculator 80b by the target product, referred to as "B" in FIG. 22, determined by the target product determiner 80a. The divider 80e works to output the result "A/B" of the division to the deviation calculator 80f.

The deviation calculator 80f works to subtract "1" from the result "A/B" of the division.

Thus, the correction angle calculator 80d works to calculate the correction angle Δθ for the estimated rotation angle θ1 based on the result of the subtraction by the deviation calculator 80f so as to make the actual product follow the target product.

For example, the correction angle calculator 80d works to:

calculate a proportional term and an integral term based on the result of the subtraction by the deviation calculator 80f; and calculate the correction angle Δθ for the estimated rotation angle θ1 based on the sum of the proportional term and the integral term.

The structure of the position corrector 90 according to the eighth embodiment reduces changes in the gain caused by the calculation of the correction angle Δθ depending on the operating conditions of the motor 10.

Specifically, the first and second amplitudes of the first and second actually propagated high-frequency signals are changed depending on change in the phase of the drive current vector for the motor 10 and the output torque thereof. For this reason, the target product is also changed depending on change in the phase of the drive current vector for the motor 10 and the output torque thereof.

Even if the amount of errors contained in the tentative rotation angle θ1 is substantially constant, the difference between the target product and the actual product is not uniquely determined so as to be changed depending on change in the phase of the drive current vector for the motor 10 and the output torque thereof. This means the gain caused by the calculation of the correction angle Δθ is changed depending on change in the phase of the drive current vector for the motor 10 and the output torque thereof.

In contrast, in the eighth embodiment, division of the actual product by the target product allows the actual product to be normalized to substantially "1". For this reason, when the amount of errors contained in the tentative rotation angle θ1 is substantially constant, it is possible to make the result of the division ("A/B") substantially constant, thereby reducing changes in the gain caused by the calculation of the correction angle Δθ.

As described above, in the control system according to the eighth embodiment, as the twentieth effect in addition to the fifteenth sixteenth, eighteenth, and nineteenth effect, it is possible to reduce changes in the gain caused by the correction of the tentative rotation angle θ1 of the rotor 10a to the actual rotation angle thereof as much as possible.

Ninth Embodiment

A control system according to a ninth embodiment of the present invention will be described hereinafter. Like parts between the control system 12 according to the seventh embodiment and the control system according to the ninth embodiment, to which like reference characters are assigned, are omitted or simplified in description.

Figure 23:
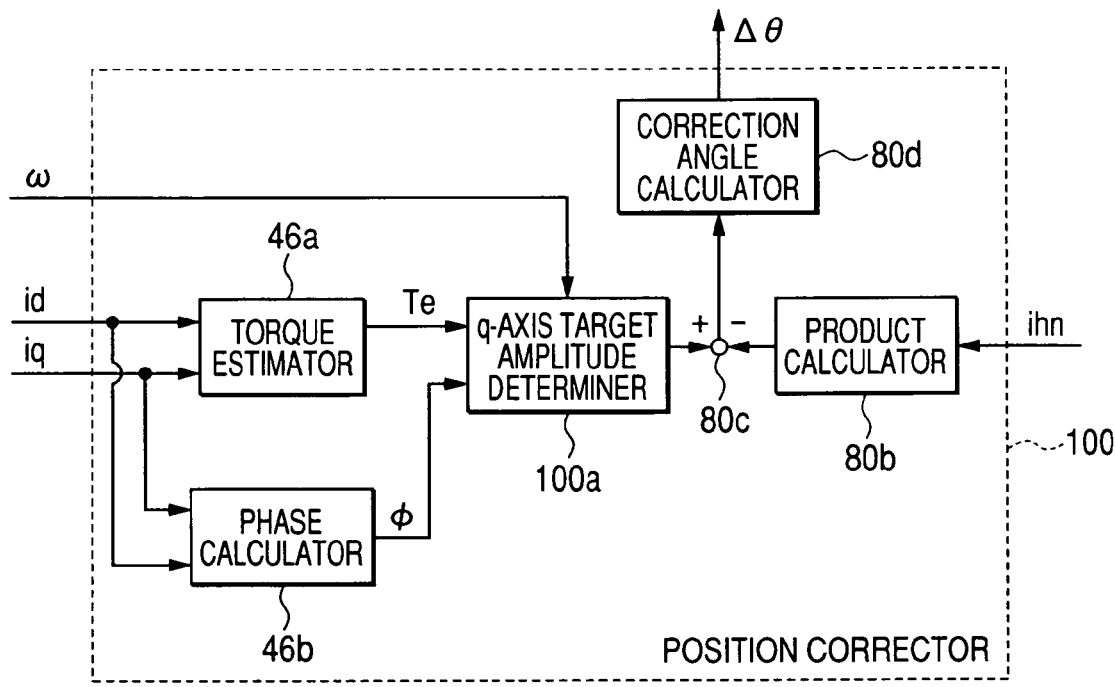
FIG. 23 is a block diagram schematically illustrating an example of the structure of a position corrector according to a ninth embodiment of the present invention.

In the control system according to the ninth embodiment, as illustrated in FIG. 23, a position corrector 100 according to the ninth embodiment is composed of a q-axis target amplitude determiner 100a in place of the target product determiner 80a and the product calculator 80b.

The q-axis target amplitude determiner 100a has stored therein the map M4 representing the relationship illustrated in FIG. 19 as a data table and/or a program.

The q-axis target amplitude determiner 100a works to reference the map M4 based on the estimated output torque Te, the calculated phase φ of the drive current vector, and the rotation speed ω so as to extract a target amplitude of the second amplitude Ihq, illustrated by the chain double-dashed line in FIG. 19, of the second actually propagated high-frequency signal (the α- and β-axis current components ihα and ihβ) associated with the estimated output torque Te, the calculated phase φ of the drive current vector, and the actual rotation speed ω of the motor 10.

Then, the difference calculator 80c works to calculate the difference between the target amplitude extracted by the q-axis target amplitude determiner 100a and the second actual amplitude ihn of the second actually propagated high-frequency signal ihq (α- and β-axis current components ihα and ihβ) extracted every time the second high-frequency voltage signal vhqc in the q-axis is output from the high-frequency voltage generator 40B.

The correction angle calculator 80d works to calculate a correction angle Δθ for the estimated rotation angle θ1 based on the difference calculated by the difference calculator 80c so as to make the second actual amplitude follow the target amplitude. For example, the correction angle calculator 80d works to:

calculate a proportional term and an integral term based on the calculated difference between the second actual amplitude and the target amplitude; and calculate the correction angle Δθ for the estimated rotation angle θ1 based on the sum of the proportional term and the integral term.

As described above, the controller according to the eighth embodiment corrects the tentative rotation angle θ1 so as to zero the difference between the target amplitude of the second actually propagated high-frequency signal obtained based on the map M4 and the second actual amplitude of the second actually propagated high-frequency signal ihq (α- and β-axis current components ihα and ihβ). This enables, as the twenty-first effect in addition to the fifteenth, sixteenth, eighteenth, and nineteenth effect, the rotation angle θ to be determined with high accuracy even if magnetic saturation is invited in the motor 10.

Especially, the target amplitude Ihq of the second actually propagated high-frequency signal is widely changed depending on change in the phase of the drive current vector for the motor 10 as compared with the target amplitude Ihd of the first actually propagated high-frequency signal (see FIG. 19). Using the target amplitude Ihq of the second actually propagated high-frequency signal to correct the tentative rotation angle θ1 of the rotor 10a makes it possible to increase the accuracy of correction of the tentative rotation angle θ1 as compared with the use of the target amplitude Ihd of the first actually propagated high-frequency signal.

Tenth Embodiment

A control system according to a tenth embodiment of the present invention will be described hereinafter. Like parts between the control system 12 according to the seventh embodiment and the control system according to the tenth embodiment, to which like reference characters are assigned, are omitted or simplified in description.

Figure 24:
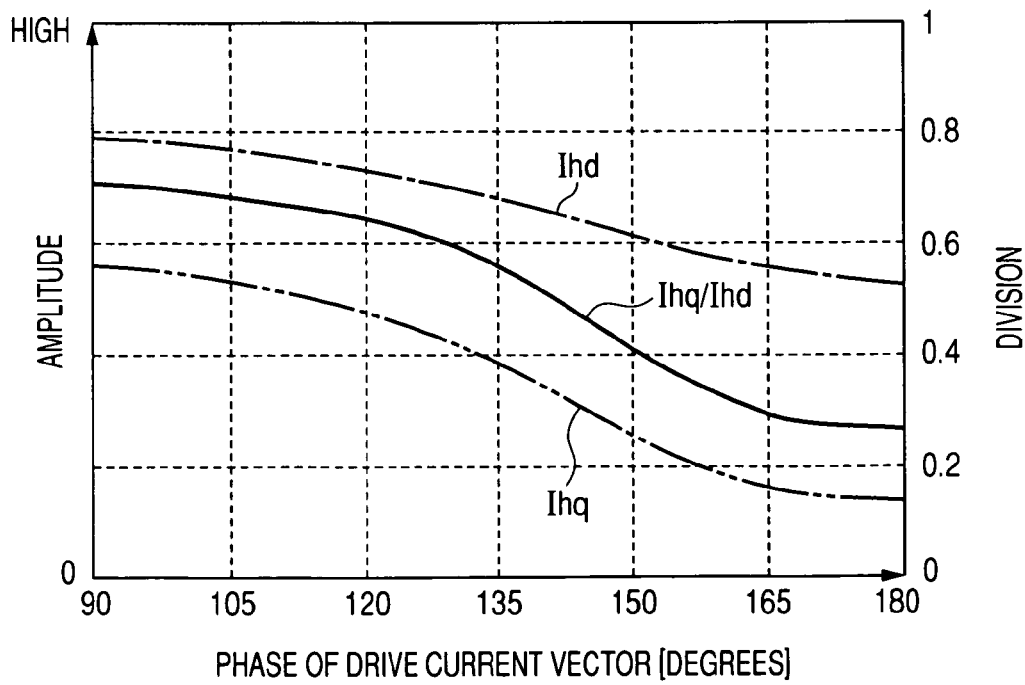
FIG. 24 is a graph schematically illustrating a relationship between:
phase of the drive current vector for output control.

FIG. 24 schematically illustrates a relationship between:

phase (phase angle) of the drive current vector for output control consisting of the d-axis current component id and q-axis current component iq;

first amplitude Ihd of the first actually propagated high-frequency signal (current) in the motor 10 when the first high-frequency signal (voltage) is superimposed on the d-axis;

second amplitude Ihq of the second actually propagated high-frequency signal (current) in the motor 10 when the second high-frequency signal (voltage) is superimposed on the q-ads; and division "Ihq/Ihd" of the second amplitude by the first amplitude in place of the product "Ihd×Ihq".

Specifically, the solid line represents the division "Ihq/Ihd" of the second amplitude Ihq by the first amplitude Ihd.

As illustrated in FIG. 24, as compared with the product "Ihd×Ihq, the amount of change in the division "Ihq/Ihd" of the second amplitude 1 by the first amplitude Ihd with change in the phase of the drive current vector decreases.

However, using the division "Ihq/Ihd" under the target product being set to less than "1" the second phenomenon illustrated in FIG. 5C allows avoidance of the second phenomenon illustrated in FIG. 5C.

Specifically, if the second phenomenon appears so that the inductance has the same magnitude in any direction of the actually propagated current vector, when the amplitude of the first high-frequency voltage signal vhdc in the d-axis and that of the second high-frequency voltage signal vhqc in the q-axis are identical to each other, the division "Ihq/Ihd" becomes "1".

For this reason, set of the target product being set to less than "1" permits the motor 10 to be driven while preventing appearance of the second phenomenon, in other words, preventing the salient characteristic of the motor 10 from being destroyed. This avoids such a situation in which the tentative rotation angle θ1 cannot be calculated due to the destroy of the salient characteristic of the motor 10.

Specifically, as illustrated in FIG. 25, a position corrector 110 according to the tenth embodiment is composed of a target division determiner 110a and a divider 110b in place of the target product determiner 80a and the product calculator 80b.

The target division determiner 110a has stored therein a map M5 representing the relationship illustrated in FIG. 24 as a data table and/or a program. The target division determiner 110a works to reference the map M5 based on the estimated output torque Te, the calculated phase d of the drive current vector, and the rotation speed ω so as to extract a target division "Div" of the second amplitude Ihq of the second actually propagated high-frequency signal by the first amplitude Ihd of the first actually propagated high-frequency signal; these first and second amplitudes Ihd and Ihg are associated with the estimated output torque Te, the calculated phase φ of the drive current vector, and the actual rotation speed ω of the motor 10.

The divider 110b works to divide the second actual amplitude ihn of the second actually propagated high-frequency signal ihq (α- and β-axis current components ihα and ihβ) extracted every time the second high-frequency voltage signal vhqc in the q-axis is output from the high-frequency voltage generator 40B by the first actual amplitude ihn of the first actually propagated high-frequency signal ihd (α- and β-axis current components ihα and ihβ) extracted every time the first high-frequency voltage signal vhdc in the d-axis is output from the high-frequency voltage generator 40B.

The difference calculator 80c works to subtract the actual division of the second actual amplitude by the first actual amplitude from the target division "Div".

The correction angle calculator 80d works to calculate a correction angle Δθ for the estimated rotation angle θ1 based on the difference calculated by the difference calculator 80c so as to make the actual division follow the target division. For example, the correction angle calculator 80d works to:

calculate a proportional term and an integral term based on the calculated difference between the actual division and the target division; and calculate the correction angle Δθ for the estimated rotation angle θ1 based on the sum of the proportional term and the integral term.

Note that, in the tenth embodiment, the high-frequency voltage generator 40B is configured to set the amplitude of the first high-frequency voltage signal vhdc in the d-axis to be identical to at of the second high-frequency voltage signal vhqc in the q-axis.

In addition, note that the target division determiner 110a is configured to set the target division "Div" to be fallen within the range from "0" to "1".

These configurations of the controller allow the motor 10 to be driven while preventing appearance of the second phenomenon, in other words, preventing the salient characteristic of the motor 10 from being destroyed.

As described above, the controller according to the tenth embodiment corrects the tentative rotation angle θ1 so as to match the actual division with the target division; this actual division being obtained by dividing the second actual amplitude ihn of the second actually propagated high-frequency signal ihq extracted every time the second high-frequency voltage signal vhqc in the q-axis is output from the high-frequency voltage generator 40B by the first actual amplitude ihn of the first actually propagated high-frequency signal ihd extracted every time the first high-frequency voltage signal vhdc in the d-axis is output from the high-frequency voltage generator 40B.

This enables, as the twenty-second effect in addition to the fifteenth, sixteenth, eighteenth, and nineteenth effect, the rotation angle δ to be determined with high accuracy even if magnetic saturation is invited in the motor 10.

The controller according to the tenth embodiment is configured to:

establish the amplitude of the first high-frequency voltage signal vhdc in the d-axis to be identical to that of the second high-frequency voltage signal vhqc in the q-axis; and set the target division "Div" to be fallen within the range from "0" to "1".

This configuration of the controller allow the motor 10 to be driven while preventing appearance of the second phenomenon, in other words, preventing the salient characteristic of the motor 10 from being destroyed Eleventh Embodiment FIG. 26 schematically illustrates an example of the structure of a control system 12E according to an eleventh embodiment of the present invention Different structural and functional points of the control system 12E from the control system 12D according to the seventh embodiment will be mainly described hereinafter. Like parts between the control systems 12D and 12E, to which like reference characters are assigned, are omitted or simplified in description.

A controller 16E of the control system 12E according to the eleventh embodiment is provided with a position/speed detector 120 in place of the position detector 45 and the speed calculator 50.

FIG. 27 schematically illustrates an example of the structure of the position/speed detector 120.

The position/speed detector 120 includes an outer product calculator 120a, a speed calculator 120b, and a tentative rotation angle calculator 120c.

The outer product calculator 120a works to calculate an outer product on the α and β axes between the vector signal of each of the first and second high-frequency voltage signals vhdc and vhqc (the α-axis voltage component vhαc and β-axis voltage component vhβc) and the vector signal consisting of the α-axis current component ihα and β-axis current component ihβ output from the high-frequency current detector 42.

The speed calculator 120b works to:

execute proportional-integral operations by calculating a proportional term and an integral term based on the outer product calculated by the outer product calculator 120a; and calculate the rotation speed ω of the motor 10 based on the sum of the proportional term and the integral term.

The tentative rotation angle calculator 120c works to calculate the tentative rotation angle θ1 based on the rotation speed ω.

Specifically, because the rotation speed ω of the motor 10 is calculated using the proportional-integral operations by the speed calculator 120b, it is possible to prevent the rotation speed ω of the motor 10 from being destabilized even if the rotation speed of the motor 10 is accelerated.

The speed calculator 120b can execute proportional-integral-differential operations by calculating a proportional term, an integral term, and a differential term based on the outer product calculated by the outer product calculator 120a, and calculate the rotation speed ω of the motor 10 based on the sum of the proportional term, the integral term, and the differential term.

Twelfth Embodiment

FIG. 28 schematically illustrates an example of the structure of a control system 12F according to a twelfth embodiment of the present invention. Different structural and functional points of the control system 12F from the control system 12D according to the seventh embodiment will be mainly described hereinafter. Like parts between the control systems 12D and 12F, to which like reference characters are assigned, are omitted or simplified in description.

A controller 16F of the control system 12F according to the twelfth embodiment includes the dq converter 22a, the fourth and fifth adders 25a and 25b, the high-frequency current generator 60, the αβ converter 41a, the dq converter 41b, the high-frequency voltage detector 66, the position detector 68, the position corrector 70, the third adder 48, and the speed calculator 50, which are substantially identical to those of the control system 12A according to the second embodiment.

The high-frequency current generator 60 works to generate a first high-frequency current signal ihdc1 in an estimated d-axis;

pass the first high-frequency current signal ihdc1 to the αβ converter 41a;

generate a second high-frequency current signal ihqc1 in an estimated q-axis; and pass the second high-frequency current signal ihqc1 to the αβ converter 41a.

The αβ converter 41a works to convert the first high-frequency current signal ihdc1 and the second high-frequency current signal ihqc1 into an α-axis current component ihαc and a β-axis current component ihβc on the respective α and β-axes of the rotor 10a based on a tentative rotation angle θ1 supplied from the position detector 68.

The operations of the dq converter 41b, the command-voltage setter 26, the dq converter 22a, the high-frequency voltage detector 60, the position detector 68, and the position corrector 70 are substantially identical to those of the dq converter 41b, the command-voltage setter 26, the dq converter 22a, the high-frequency voltage detector 60, the position detector 68, and the position corrector 70 of the control system 12A according to the second embodiment.

As described above, the control system 12F according to the twelfth embodiment has substantially the same first to fifth effects as the control system 12D according to the seventh embodiment.

Thirteenth Embodiment

FIG. 29 schematically illustrates an example of the structure of a control system 12G according to a thirteenth embodiment of the present invention. Different structural and functional points of the control system 12G from the control system 12D according to the seventh embodiment will be mainly described hereinafter. Like parts between the control systems 12D and 12G, to which like reference characters are assigned, are omitted or simplified in description.

A controller 16G of the control system 12G according to the thirteenth embodiment is provided with a position/speed detector 130 in place of the position detector 45 and the speed calculator 50.

In the thirteenth embodiment, the high-frequency voltage generator 40 works to generate the high-frequency voltage signal vhdc in an estimated d-axis, and pass it to the αβ converter 41.

The Δθ converter 41 works to convert the high-frequency voltage signal vhdc into the α-axis voltage component vhαc and the β-axis voltage component vhβc on the respective α and β-axes of the rotor 10a based on a rotation angle θ supplied from a position/speed detector 130.

FIG. 30 schematically illustrates an example of the structure of the position/speed detector 130.

The position/speed detector 130 includes an outer product calculator 130a, a saturation compensator 130b, an adder 130c, a position calculator 130d, and a speed calculator 130e.

The outer product calculator 130a works to calculate an outer product between the vector signal of the first high-frequency voltage signal vhdc (the α-axis voltage component vhαc and β-axis voltage component vhβc) and the vector signal consisting of the α-axis current component ihα and β-axis current component ihβ output from the high-frequency current detector 42.

The saturation compensator 130b has stored therein a map M6 representing a function of torque demand and compensation value and works to:

receive the torque demand data Td;

grasp a magnetic saturation level of the motor 10 based on the input value of the torque demand data Td; and calculate a compensation value based on the map M6, the input value of the torque demand data Td, and the grasped magnetic saturation level.

The compensation value is equivalent to the result value of the outer product when the rotation angle θ of the rotor 10a coincides with the real rotation angle thereof; the sign of the compensation value is reversed from that of the result value of the outer product.

The more the input value of the torque demand data Td increases, the more the absolute value of the compensation value increases. In place of the map M6, the compensation value can be calculated using at least one relational expression between compensation value and torque demand, such as a linear function expression obtained by approximating compensation value by linear function of torque demand.

The adder 130c works to obtain the sum of the result value of the outer product by the outer product calculator 130a and the compensation value calculated by the saturation compensator 130b.

The position calculator 130d works to calculate the rotation angle θ of the rotor 10a so as to eliminate the difference between the result value of the outer product and the compensation value.

The speed calculator 130e works to calculate the rotation speed X) of the motor 10 based on the calculated rotation angle θ of the motor 10. For example, the speed calculator 130e works to calculate the rotation speed ω of the motor 10 by temporally differentiating the rotation angle θ of the rotor 10a.

As described above, in the thirteenth embodiment, it is possible to easily calculate the rotation angle θ of the rotor 10a based on the map or at least one relational expression representing the function of torque demand and compensation value, thus reducing the load of the computer system 12G (controller 16G) required to obtain the rotation angle θ of the rotor 10a.

Specifically, in the thirteenth embodiment, even under magnetic saturation being invited in the motor 10, it is possible to calculate the rotation angle θ of the rotor 10a so as to match the absolute value of the result value of the outer product with the compensation value determined depending on the magnetic saturation level in the motor 10. This allows the rotation angle θ of the rotor 10a to be calculated with high accuracy.

In addition, in the thirteenth embodiment, the controller 16G is configured to variably determine the compensation value depending on the input value of the torque demand data Td. This makes it possible to precisely match the result value of the outer product estimated when the rotation angle θ properly coincides with the actual rotation angle of the rotor 10a.

Fourteenth Embodiment

A control system according to a fourteenth embodiment of the present invention will be described hereinafter. Different structural and functional points of the control system according to the fourteenth embodiment from the control system 12D according to the seventh embodiment will be mainly described hereinafter. Like parts between the control systems of the seventh and fourteenth embodiments, to which like reference characters are assigned, are omitted or simplified in description FIG. 31 schematically illustrates an example of the structure of a position/speed detector 140.

In the position/speed detector 140, the speed calculator 130e works to calculate the rotation speed t) of the motor 10 based on the difference between the result value of the outer product and the compensation value.

For example, the speed calculator 130e works to, execute proportional-integral operations by calculating a proportional term and an integral term based on the difference between the result value of the outer product and the compensation value; and calculate the rotation speed ω of the motor 10 based on the sum of the proportional term and the integral term.

The position calculator 130d works to calculate the rotation angle θ of the rotor 10a based on the rotation speed ω of the motor 10.

Because the rotation speed ω of the motor 10 is calculated using the proportional-integral operations by the speed calculator 130e, it is possible to prevent the rotation speed ω of the motor 10 from being destabilized even if the rotation speed of the motor 10 is accelerated.

The speed calculator 130e can execute proportional-integral-differential operations by calculating a proportional term, an integral term, and a differential term based on the difference between the result value of the outer product and the compensation value, and calculate the rotation speed ω of the motor 10 based on the sum of the proportional term, the integral term, and the differential term.

In at least one of the second and twelfth embodiments, the instantaneous current components id and iq can be converted into an α-axis voltage component vα and a β-axis voltage component vβ on the α and β axes, and the converted α-axis voltage component vα and a β-axis voltage component vβ can be input to the high-frequency voltage detector 66.

In this modification, the high-frequency voltage detector 66 can generate the α- and β-axis voltage components vhα and vhβ on the respective α and β axes based on the converted α-axis voltage component vα and a β-axis voltage component vβ; these α- and β-axis voltage components vhα and vhβ are based on only the actually propagated high-frequency currents.

In contrast, the α- and β-axis voltage components vhα and vhβ to be output from the high-frequency voltage detector 66 according to each of the second and twelfth embodiments contain signal components generated by the high-frequency current generator 60. However, the structure of the high-frequency voltage detector 66 according to each of the second and twelfth embodiments can use the αβ converter 27 required to convert the instantaneous current components id and iq for control of the output of the motor 10 without requiring another converter function, making it possible to simplify the operations of the controller.

In at least one of the first to fourteenth embodiments, at least one of the target amplitude, target product, and target division can be determined based on only the estimated output torque Te, or based on at least one of the phase φ of the drive current vector and the rotation speed ω of the motor 10 in addition to the estimated output torque Te.

In at least one of the first to fourteenth embodiments, at least one of the target amplitude, target product, and target division can be determined based on the rotation speed ω of the motor 10 in addition to the estimated output torque Te and the calculated phase φ of the drive current vector. The target amplitude of the actually propagated high-frequency signal can also be determined based on the phase φ of the drive current vector and the rotation speed ω of the motor 10.

As described above, in each of the first to fourteenth embodiments, the estimated output torque Te is used to determine: the second correction angle Δθ b, the target amplitude, selection of the first and second correction angles Δβa and Δβb, target product, and target division. In place of the estimated output torque Te, however, a parameter associated with the output torque of the motor 10, such as the torque demand data Td can be used.

In addition, in place of the torque demand data, the pair of d-axis and q-axis command currents idc and iqc or the pair of instantaneous draws and q-axis current components id and iq can be used to determine: the second correction angle Δθ b, the target amplitude, selection of the first and second correction angles Δθa and Δβb, target product, and target division. Because the output torque of the motor 10 is determined depending on the pair of instantaneous d-axis and q-axis current components id and iq, the pair of instantaneous d-axis and q-axis current components id and iq is a parameter associated with the output torque of the motor 10. Moreover, because the pair of instantaneous d-axis and q-axis current components id and iq is controlled based on the pair of d-axis and q-axis command currents idc and iqc, the pair of d-axis and q-axis command currents idc and iqc is a parameter associated with the pair of instantaneous d-axis and q-axis current components id and iq, and therefore, associated with the output torque of the motor 10.

In at least one of the first to fourteenth embodiments, when the outer product operation are used, they can be executed based on the d-q coordinate system.

In at least one of the embodiments except for the second and sixth embodiments, the high-frequency current signal can be used to be superimposed on the d-axis and q-axis command currents idc and iqc in place of the high-frequency voltage signal.

In at least one of the first to fourteenth embodiments, when the high-frequency voltage signal vhdc can be superimposed on the d-axis and q-axis command voltages vdc and vqc based on the correction angle Δβ.

In the thirteenth and fourteenth embodiments, a direction in which the high-frequency signal is to be superimposed can be set to the q-axis in place of the d-axis. In this modification, an oscillating direction of the actually propagated high-frequency signal is different from that of the superimposed high-frequency signal, and the difference in phase between the actually propagated high-frequency signal and the superimposed high-frequency signal can depend on the magnetic saturation level of the motor 10. This modification therefore can also obtain the effects obtained in the thirteenth and fourteenth embodiments.

As the actually propagated high-frequency signal in the motor 10, it is possible to use a vector signal that can be calculated based on a detected value of one of a plurality of electric state quantities of the motor 10 except for one of the plurality of electric state quantities on which another vector signal is superimposed for detection of the rotation angle of the rotor 10a.

For example, when the high-frequency voltage signal (another vector signal) is superimposed on the command voltage components, such as the vαc and vβc, a vector signal that can be calculated based on detected values of one of the plurality of electric state quantities of the motor 10 except for the voltage, such as current, can be used.

How to calculate the rotation angle (tentative rotation angle) of the rotor 10a using a characteristic in which a current is biased when a high-frequency signal to be superimposed on the output of the inverter 14 is actually propagated in the motor 10 is not limited to the various methods described in the embodiments set forth above.

Specifically, in accordance with inner product of a vector signal (high-frequency signal) A to be superimposed on the output of the inverter 14 and a vector signal (high-frequency signal) B to be actually propagated in the motor 10, the tentative rotation angle θ1 can be calculated such that the value "1−A·B/|A||B|" becomes zero. In this modification, it is possible to calculate the tentative rotation angle θ1 that allows the difference between the vector signals A and B in phase to become zero without using inverse trigonometric functions. In addition, it is possible to calculate the tentative rotation angle θ1 that allows the difference between the vector signals A and B in phase to become zero using inverse trigonometric functions except for the outer product or inner product of the vector signals A and B.

A method of setting the command contents idc and iqc is not limited to the method illustrated in FIG. 6 or in FIG. 17. Specifically, the command currents idc and iqc can be set based on various requests without using the phase of the output-control current vector with respect to the positive direction of the d-axis and using the torque maximization curve.

The motor 10 whose rotor 10a has a salient structure is not limited to the structure of the rotor 10a illustrated in FIG. 2. For example, another IPMSM structured rotor can be used (see FIG. 32A), or a rotor 10c having the salient structure in which magnetic resistance in the d-axis is higher than the q-axis for synchronous reluctance motors (SynRM) can be used.

In each of the first to fourteenth embodiments, the motor 10 is used as an example of multiphase rotary electric machines, but a multiphase power generator can be used. When the multiphase power generator is used, the closer the estimated d-axis is, the easier the second phenomenon and third phenomenon appear. For this reason, determination of the command current components for preventing the salient characteristic from being destroyed allows the rotation angle (tentative rotation angle) of the rotor 10a to be smoothly calculated using a characteristic in which a current is biased when a high-frequency signal to be superimposed on the output of the inverter 14.

In each of the first to fourteenth embodiments, the control system is applied to a motor installed in a hybrid vehicle, but can be applied to a multiphase rotary electric machine installed in another vehicle, such as an electric vehicle, a motor vehicle, an engine-driven vehicle. For example, the control system in each of the first to fourteenth embodiments can be applied to a motor installed in an engine-driven vehicle; this motor serves as a power transferring system, such as a power steering system.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A system for controlling rotation of a salient rotor of a multiphase rotary electric machine in relation to a stator thereof, an output of the multiphase rotary electric machine being controlled based on an input signal thereto, the system comprising:
    a superimposing unit configured to superimpose, on the input signal to the multiphase rotary electric machine, a direct-axis frequency signal directed in a direct axis of the rotor and a quadrature-axis frequency signal directed in a quadrature axis of the rotor orthogonal to the direct axis, each of the direct-axis and quadrature-axis frequency signals having a first phase and a first period, the first period being different from a period of rotation of the rotor;
    a tentative angle calculator configured to calculate a tentative rotation angle of the rotor based on the phase of a first frequency signal being actually propagated in the multiphase rotary electric machine due to the superimposed direct axis frequency signal; and
    a corrector configured to correct the tentative rotation angle calculated by the tentative angle calculator so as to eliminate a difference between an amplitude of a second frequency signal and a predetermined target amplitude thereof, the second frequency signal being actually propagated in the multiphase rotary electric machine due to at least the superimposed quadrature-axis frequency signal.

2. A system according to claim 1, wherein the corrector is configured to correct the tentative rotation angle calculated by the tentative angle calculator so as to eliminate a difference between (a) a first product of amplitude of the first frequency signal and amplitude of the second frequency signal and (b) a target value, the target value corresponding to a second product of the amplitude of the first frequency signal and the amplitude of the second frequency signal.

3. A system according to claim 1, wherein the corrector is configured to correct the tentative rotation angle calculated by the tentative angle calculator so as to match a first division with a target value, the first division being obtained by dividing amplitude of the second frequency signal by amplitude of the first frequency signal, the target value corresponding to a second division of the amplitude of the second frequency signal by the amplitude of the first frequency signal.

4. A system according to claim 3, wherein the superimposing unit is configured to set an amplitude of the direct-axis frequency signal to be equal to that of the quadrature-axis frequency signal, and the target value is determined to a value greater than 0 and lower than 1.

5. A system according to claim 1, wherein the corrector is configured to correct the tentative rotation angle calculated by the tentative angle calculator so as to cause the difference between the amplitude of the second frequency signal and the predetermined target amplitude thereof to become zero.

6. A system according to claim 2, wherein:
    the corrector is configured to detect at least one of:
        phase of a drive current vector, the drive current vector being input to the multiphase rotary electric machine via the input signal for control of an output torque thereof;
        information associated with the output torque of the multiphase rotary electric machine; and
        rotation speed of the rotor, and
    wherein the corrector is configured to determine the target value based on at least one of the detected (a) phase of the drive current vector, (b) the information, and (c) the rotation speed.

7. A system according to claim 3, wherein:
    the corrector is configured to detect at least one of:
        phase of a drive current vector, the drive current vector being input to the multiphase rotary electric machine via the input signal for control of an output torque thereof;
        information associated with the output torque of the multiphase rotary electric machine; and
        rotation speed of the rotor, and
    wherein said corrector is configured to determine the target value based on at least one of the detected (a) phase of the drive current vector, (b) the information, and (c) the rotation speed.

8. A system according to claim 1, wherein the tentative angle calculator further comprises:
    a first unit configured to calculate a parameter associated with a difference between a first vector signal composed of the direct-axis frequency signal and the quadrature-axis frequency signal and a second vector signal composed of the first and second frequency signals;
    a second unit configured to calculate a rotation speed of the rotor based on the calculated parameter; and
    a third unit configured to calculate the tentative rotation angle based on an integrated value of the calculated rotation speed of the rotor.

9. A system according to claim 1, wherein the tentative angle sensor is configured to calculate tentative rotation angle of the rotor based on a difference in phase between the first frequency signal and the superimposed direct axis frequency signal.

* * * * *